US010113354B2

(12) United States Patent
Queck et al.

(10) Patent No.: US 10,113,354 B2
(45) Date of Patent: Oct. 30, 2018

(54) MULTIPLE-PANE INSULATING GLAZING UNIT ASSEMBLY, GAS FILLING, AND PRESSING MACHINE

(71) Applicant: Cardinal IG Company, Eden Prairie, MN (US)

(72) Inventors: Curtis Lee Queck, Spring Green, WI (US); Michael John Milewski, Poynette, WI (US); Robert Casper Buchanan, Spring Green, WI (US)

(73) Assignee: Cardinal IG Company, Eden Prairie, MN (US)

( * ) Notice: Subject to any disclaimer, the term of this patent is extended or adjusted under 35 U.S.C. 154(b) by 584 days.

(21) Appl. No.: 14/145,707

(22) Filed: Dec. 31, 2013

(65) Prior Publication Data
US 2015/0184447 A1    Jul. 2, 2015

(51) Int. Cl.
*E06B 3/677* (2006.01)
*E06B 3/673* (2006.01)
(Continued)

(52) U.S. Cl.
CPC .......... *E06B 3/6775* (2013.01); *E06B 3/6608* (2013.01); *E06B 3/66304* (2013.01);
(Continued)

(58) Field of Classification Search
CPC .... E06B 3/673; E06B 3/67326; E06B 3/6775; B32B 17/10807
(Continued)

(56) References Cited

U.S. PATENT DOCUMENTS 3,078,627 A    2/1963 Dunipace et al.
3,683,974 A    8/1972 Stewart et al.
(Continued)

FOREIGN PATENT DOCUMENTS

AT    405932 B    12/1999
AT    409128 B    5/2002
(Continued)

OTHER PUBLICATIONS

Machine Translation of DE4437998.*
International Search Report and Written Opinion dated May 22, 2014 for PCT Application No. PCT/US2014/018255, 8 pages.

*Primary Examiner* — Christopher T Schatz
(74) *Attorney, Agent, or Firm* — Fredrikson & Byron, P.A.

(57) ABSTRACT

A system for producing multiple-pane insulating glazing units can include a conveyor and a plurality of laterally spaced-apart processing stations that are movable transversely relative to the longitudinally extending conveyor line. Each processing station may assemble glazing panes and a glazing spacer into a partially fabricated glazing unit, deliver insulative gas to a between-pane space between the glazing panes, and press the partially fabricated glazing unit together to seal the insulative gas in the between-pane space and form the multiple-pane insulating glazing unit. In some examples, each processing station moves to an alignment position with the conveyor to load glazing panes and a glazing spacer and then performs individual fabrication steps while offset from the conveyor. During this time, a different processing station can be aligned with the conveyor to unload a fabricated multiple-pane insulating glazing units and/or load unassembled glazing panes and a glazing spacer.

25 Claims, 11 Drawing Sheets

(51) Int. Cl.
*E06B 3/66* (2006.01)
*E06B 3/663* (2006.01)

(52) U.S. Cl.
CPC .......... *E06B 3/66309* (2013.01); *E06B 3/673* (2013.01); *E06B 3/67326* (2013.01); *Y10T 29/49829* (2015.01); *Y10T 29/534* (2015.01)

(58) Field of Classification Search
USPC ......... 425/185, 182; 198/463.2; 65/171–173; 264/297.6, 297.8
See application file for complete search history.

(56) References Cited

U.S. PATENT DOCUMENTS

| | | | |
|---|---|---|---|
| 4,369,084 A | 1/1983 | Lisec | |
| 4,601,772 A * | 7/1986 | McKelvey | B32B 17/10853 156/104 |
| 4,780,164 A | 10/1988 | Rueckheim | |
| 4,886,095 A | 12/1989 | Lisec | |
| 4,909,874 A | 3/1990 | Rueckheim | |
| 4,921,022 A | 5/1990 | Lisec | |
| 5,017,252 A | 5/1991 | Aldrich et al. | |
| 5,051,145 A | 9/1991 | Lendhardt | |
| 5,110,337 A | 5/1992 | Lisec | |
| 5,139,595 A | 8/1992 | Taylor | |
| 5,223,001 A * | 6/1993 | Saeki | C23C 14/566 118/719 |
| 5,332,080 A | 7/1994 | Lendhardt | |
| 5,350,469 A | 9/1994 | Lenhardt et al. | |
| 5,366,574 A | 11/1994 | Lenhardt et al. | |
| 5,413,156 A | 5/1995 | Lisec | |
| 5,476,124 A | 12/1995 | Lisec | |
| 5,573,618 A | 11/1996 | Rueckheim | |
| 5,626,712 A | 5/1997 | Lisec | |
| 5,645,678 A | 7/1997 | Lisec | |
| 5,676,782 A | 10/1997 | Lisec | |
| 5,704,405 A | 1/1998 | Lisec | |
| 5,762,739 A | 6/1998 | Lenhardt et al. | |
| 5,932,062 A | 8/1999 | Manser | |
| 5,957,169 A | 9/1999 | Trpkovski | |
| 6,158,483 A | 12/2000 | Trpkovski | |
| 6,216,751 B1 | 4/2001 | Trpkovski | |
| 6,622,456 B2 | 9/2003 | Almasy | |
| 7,001,464 B1 | 2/2006 | Erdman | |
| 7,299,844 B2 | 11/2007 | Lisec | |
| 7,785,432 B2 | 8/2010 | Lenhardt | |
| 7,807,003 B2 | 10/2010 | Schuler | |
| 7,833,372 B2 | 11/2010 | Lenhardt | |
| 8,196,635 B2 | 6/2012 | Lenhardt | |
| 2002/0098254 A1 * | 7/2002 | Hutchison | B29C 47/0818 425/71 |
| 2007/0295441 A1 | 12/2007 | Schuler | |
| 2009/0124158 A1 * | 5/2009 | Hwang | B32B 38/162 445/24 |
| 2009/0205743 A1 | 8/2009 | Vianello | |
| 2011/0017404 A1 | 1/2011 | Schuler | |
| 2011/0303349 A1 | 12/2011 | Nieminen | |
| 2011/0315270 A1 | 12/2011 | McHugh | |
| 2012/0037293 A1 | 2/2012 | Mader | |
| 2012/0180936 A1 | 7/2012 | Schuler | |
| 2012/0199272 A1 | 8/2012 | Mader | |
| 2012/0205033 A1 | 8/2012 | Schuler et al. | |
| 2012/0234466 A1 | 9/2012 | Balbi | |
| 2012/0266455 A1 | 10/2012 | Schuler | |
| 2012/0285605 A1 | 11/2012 | Ripoche | |

FOREIGN PATENT DOCUMENTS

| | | | |
|---|---|---|---|
| DE | 9302744 U1 | 5/1994 | |
| DE | 4437998 A1 * | 8/1995 | ......... E06B 3/67365 |
| EP | 0615044 A1 | 9/1994 | |
| EP | 1063383 A2 | 12/2000 | |
| WO | 2007009642 A2 | 1/2007 | |

* cited by examiner

MULTIPLE-PANE INSULATING GLAZING UNIT ASSEMBLY, GAS FILLING, AND PRESSING MACHINE

TECHNICAL FIELD

This disclosure relates to insulating glazing units and, more particularly, to the fabrication of insulating glazing units.

BACKGROUND

Insulating glazing units, such as double pane and triple pane insulating glass units, are commonly used in windows and doors. The insulating glazing units generally have a series of transparent panes separated by gas spaces. For example, a double pane insulating glass unit may have two glass panes separated by a gas space. In order to hold the glass panes apart to provide the gas space, a spacer is inserted between the two glass panes. The spacer can both hold the glass panes apart from one another and also hermetically seal the gas space created between the panes. The hermetically sealed gas space can be filled with an insulative gas or evacuated to create a vacuum environment, reducing thermal transfer across the gas space and, ultimately, the entire insulating glazing unit.

For commercial manufacturers of insulating glazing units, the ability to efficiently and accurately fabricate multiple-pane insulating glazing units can dictate the economics of operation and the reliability of the fabricated multiple-pane insulating glazing units over their intended service life. For example, ensuring that a spacer is accurately positioned and sealed between two opposing glazing panes and that the between-pane space is appropriately filled with insulative gas can help ensure the multiple-pane insulating glazing unit maintains its thermal efficiency and visible appearance over the service life of the unit.

As consumers have increasingly demanded more custom sized and shaped insulating glazing units to fit their desired architectural plans, manufacturers have been challenged to efficiently produce a wide variety of different multiple-pane insulating glazing units while maintaining tolerance standards. Oftentimes, this has required adding additional insulating glazing unit production lines to accommodate the reduced throughput attendant to producing custom units.

SUMMARY

In general, this disclosure relates to techniques and equipment for fabricating multiple-pane insulating glazing units. In some examples, a system includes a conveyor and multiple processing stations that move back and forth relative to the conveyor. The conveyor may have an ingress or load section that loads the process stations with components for fabricating a multiple-pane insulating glazing unit and an egress or unload section on which a fabricated multiple-pane insulating glazing unit is discharged. During operation, a specific processing station can move into alignment with the conveyor for loading two or more glazing panes and one or more glazing spacers into the processing station. The loaded processing station can then move to an offset location while a separate processing station is moved into alignment with the conveyor for loading. While the loaded processing station is moved to an offset location or once moved there, the loaded processing station can process the glazing panes and spacer within the processing station to fabricate the multiple-pane insulating glazing unit. For example, the loaded processing station may deliver insulative gas to a between-pane space of a partially fabricated insulating glazing unit and press the glazing panes together, sealing the insulative gas with the spacer and thereby forming the multiple-pane insulating glazing unit. By configuring the system with multiple processing stations, comparatively slow processing tasks, such as filling a partially fabricated insulating glazing unit with insulative gas, can occur offline while the conveyor is loading and/or unloading a different processing station. This can increase overall production capacity of the system as compared to if the system only had a single processing station.

Independent of the specific number of processing stations included in a fabrication system, a processing station may be configured to efficiently produce a variety of differently dimensioned and/or shaped multiple-pane insulating glazing units. This can be useful for processing orders containing non-standard or custom sized and/or shaped insulating glazing units. In one example, the processing station has a pair of movable seals that are configured to move parallel to platens providing a processing zone in which the constituent components of a glazing assembly are assembled, gas filled, and pressed together to fabricate a multiple-pane insulating glazing unit. Either one or both of the movable seals can move to adjust the locations at which side boundaries of a gas chamber are sealed, thereby specifically configuring the gas chamber for the length and/or shape of the specific multiple-pane insulating glazing unit to be assembled. In some examples, the processing station also has a longitudinally elongated manifold configured to deliver insulative gas into a partially fabricated insulating glazing unit during assembly. The operational length of the longitudinally elongated manifold may be adjusted so that gas is only delivered through that portion of the manifold corresponding to the gas chamber bounded by the movable seals. By appropriately configuring the processing station with suitable adjustability, the station may process a variety of different dimensioned and/or shaped multiple-pane insulating glazing units, e.g., without requiring the constituent components of a glazing unit to be reoriented to accommodate a specific processing unit configuration and/or without consuming excess gas and time during gas filling.

In one example, a system for producing multiple-pane insulating glazing units is described. The system includes a conveyor and a machine that assembles two or more glazing panes and one or more glazing spacers into a multiple-pane insulating glazing unit. According to the example, the conveyor includes a longitudinally extending conveyor line configured to transport glazing panes to the machine. The example further specifies that the machine includes a plurality of laterally spaced-apart processing stations, each processing station being movable transversely relative to the longitudinally extending conveyor line. In one embodiment in accordance with this example, each processing station is configured to assemble at least two types of units, e.g., both double pane units and triple pane units.

In another example, a method is described that includes aligning one of a plurality of laterally spaced-apart processing stations with a longitudinally extending conveyor line. The method also includes conveying two or more glazing panes and one or more glazing spacers into the aligned one of the plurality of laterally spaced-apart processing stations via the longitudinally extending conveyor line, thereby establishing a loaded processing station. The method further includes assembling the two or more glazing panes and the one or more glazing spacers into a multiple-pane insulating glazing unit inside of the loaded processing station.

In another example, a machine is described that includes a processing station configured to assemble two or more glazing panes and one or more glazing spacers into a multiple-pane insulating glazing unit. The example specifies that the processing station includes two platens, a processing zone between the two platens, a longitudinally extending conveyance line disposed adjacent a lower region of at least one of the two platens, and a pair of movable seals. Each seal is movable relative to and between the two platens, such that the two seals, when moved to desired working positions, delineate two side boundaries of a gas fill chamber in which a partially fabricated insulating glazing unit can be disposed. The example also specifies that both seals are movable such that each side boundary can be established at different locations depending on a length or a shape of a multiple-pane insulating glazing unit to be assembled at a given time.

The details of one or more examples are set forth in the accompanying drawings and the description below. Other features, objects, and advantages will be apparent from the description and drawings, and from the claims.

BRIEF DESCRIPTION OF DRAWINGS

FIG. 10 is an illustration of an example multiple-pane insulating glazing unit that can be fabricated using the equipment and techniques discussed herein.

FIG. 11 is a flow diagram of an example technique for fabricating a multiple-pane insulating glazing unit.

DETAILED DESCRIPTION

Figure 1:
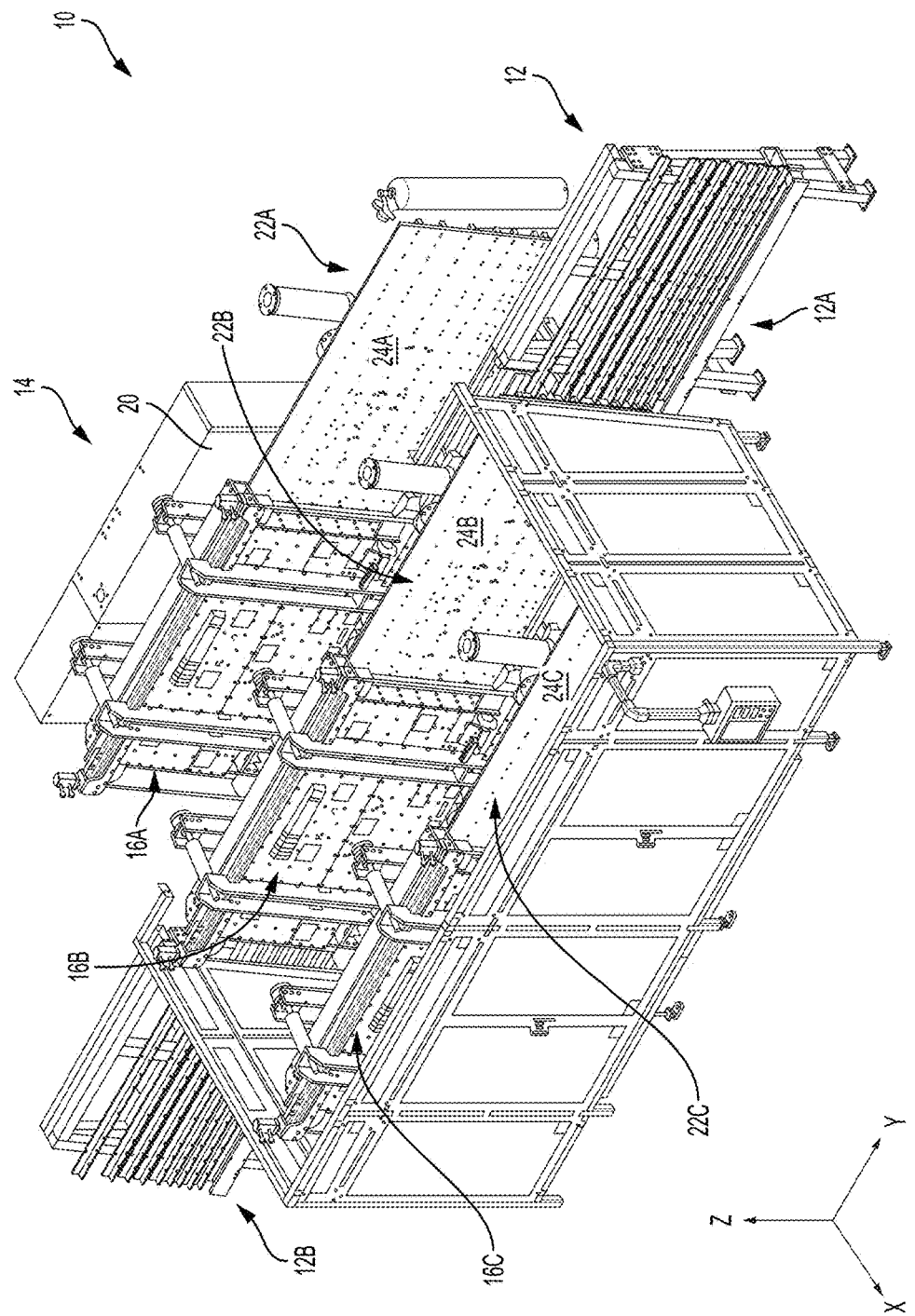
FIG. 1 is a perspective view of an example system for producing multiple-pane insulating glazing units.

In general, an insulating glazing unit provides an optically transparent thermally insulating structure that can be mounted in the wall of a building. In different examples, the insulating glazing unit may fabricated from two panes of material, which may be referred to as a double pane insulating glazing unit, three panes of material, which may be referred to as a triple pane insulating glazing unit, or even four or more panes of material. Each pane of material in the insulating glazing unit may be separated from an opposing pane of material by a between-pane space, which may be filled with an insulative gas or evacuated to create a vacuum. Increasing the size and number of between-pane spaces in the insulating glazing unit typically increases the thermal efficiency of the unit by reducing the thermal conductivity across the insulating glazing unit.

This disclosure relates to devices, systems, and techniques for fabricating multiple-pane insulating glazing units. In some examples, a multiple-pane insulating glazing unit is fabricated by loading a machine having multiple processing stations with two or more glazing panes and one or more glazing spacers. The multiple processing stations may be spaced side-to-side relative to a conveyer line that delivers glazing panes and glazing spacers to the processing stations. In operation, one of the processing stations can move into alignment with the conveyor line for loading and then move to the side, out of alignment with the conveyor line, for further processing the glazing panes and the glazing spacer(s) into a multiple-pane insulating glazing unit. While this is occurring, a different processing station can move into alignment with the conveyor line for loading. Once loaded, the processing station can move to the side, out of alignment with the conveyor line. For embodiments that include three processing stations, a third processing station can move into alignment with the conveyor line as the second processing station moves to the side, out of alignment with the conveyor line. In such embodiments, the third processing station can be loaded and thereafter moved to the side, while a processing station that was previously loaded moves back into alignment with the conveyor line. The previously loaded processing station can then discharge a fabricated multiple-pane insulating glazing unit and be reloaded with two or more glazing panes and one or more glazing spacers for forming a subsequent multiple-pane glazing unit. In this way, the conveyor line can operate substantially continuously with comparatively time consuming fabrication tasks being performed while one or more processing stations are out of alignment with the conveyor line.

Each processing station may be configured to fabricate a multiple-pane insulating glazing unit by assembling the constituent components of the glazing unit into appropriate relative alignment, filling a space between opposed glazing panes with an insulative gas, and then pressing the glazing panes together to seal the insulative gas in the space. For example, each processing station may be loaded by operating a conveyor to sequentially load the processing station with a glazing pane having a glazing spacer adhered about its periphery and another glazing pane not carrying a spacer. The glazing panes may be positioned and held in generally parallel, spaced-apart alignment and a processing zone in which the glazing panes are held may be sealed for gas filling. After suitably filling the processing zone with insulative gas (e.g., a mix of argon and air), thereby filling the space between the glazing panes, the glazing panes may be pressed toward one another, pressing the glazing spacer against the opposing glazing pane and thereby sealing the multiple-pane insulating glazing unit.

An example processing station and an example insulating glazing unit will be described in greater detail with respect to FIGS. 4-10. However, an example system for producing multiple-pane insulating glazing units that includes multiple processing stations will first be described with respect to FIGS. 1-3.

Figure 2A:
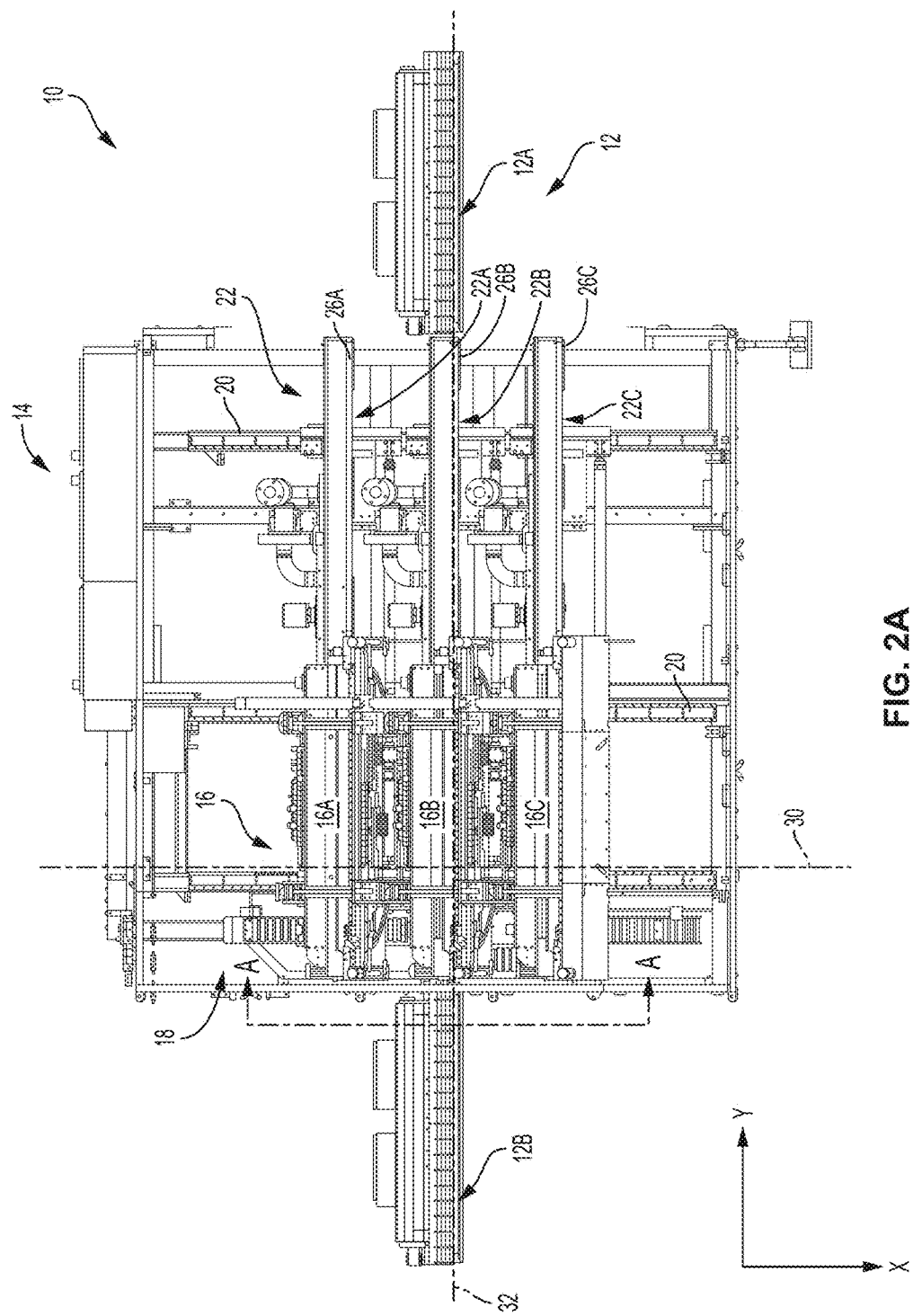
FIGS. 2A-2C are top views of the example system of FIG. 1 showing different example operating positions for the processing stations in the system.
Figure 2B:
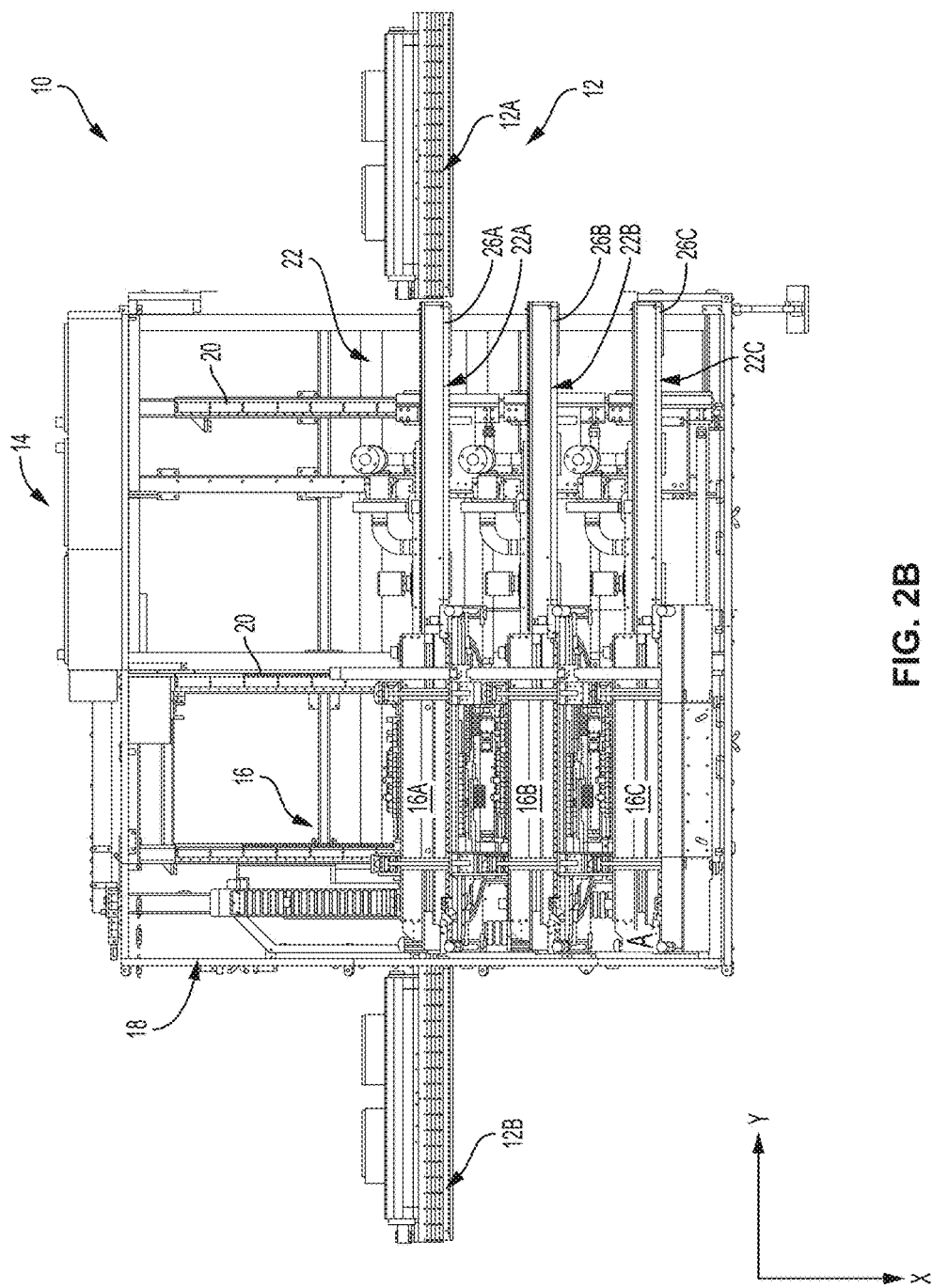
Figure 2C:
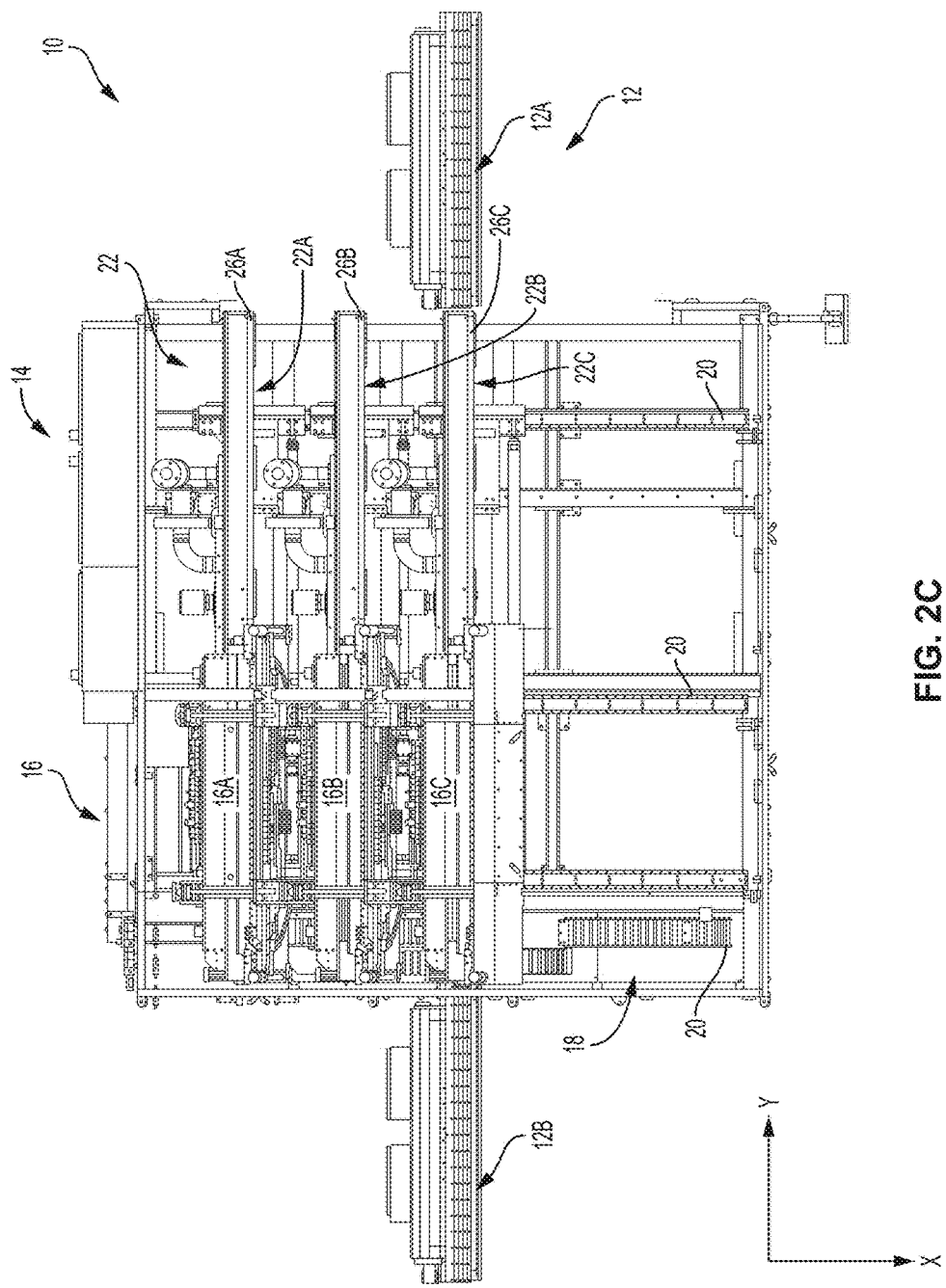

FIG. 1 is a perspective view of an example system 10 for producing multiple-pane insulating glazing units. FIGS. 2A-2C are top plan views of the example system 10 of FIG. 1 showing different example equipment operating positions. As shown in FIGS. 1 and 2, example system 10 includes a conveyor 12 and a machine 14 that assembles and processes glazing unit components into a multiple-pane insulating glazing unit. Machine 14 includes multiple processing stations configured to move relative to conveyor 12. In the example of FIGS. 1 and 2, machine 14 has three processing stations 16A, 16B, 16C (referred to herein as "processing station 16" when describing an individual station or "processing stations 16" when describing all stations). Conveyor 12 includes an ingress or inlet section 12A at an inlet side of machine 14 and an egress or outlet section 12B at a discharge side of the machine. If desired, the ingress or inlet section of the conveyor can include, or be, a pane flipper (or a flipper can be provided upstream from the ingress section of the conveyor). In operation, one of the processing stations 16 can move into alignment with conveyor 12 such that glazing components can be delivered into the aligned processing station via ingress conveyor section 12A and ultimately the resulting assembled multiple-pane insulating glazing unit can be discharged from the aligned processing station via egress conveyor section 12B. For example, FIGS. 1 and 2A illustrate processing station 16B as being aligned with conveyor 12. By contrast, FIGS. 2B and 2C illustrate processing stations 16A and 16C, respectively, as being aligned with conveyor 12. After receiving glazing panes and one or more glazing spacers and/or discharging a fabricated multiple-pane insulating glazing unit, an aligned processing station can move out of alignment with conveyor 12 and a different processing station can move into alignment with the conveyor.

Processing stations 16 are illustrated in FIGS. 1 and 2 as being laterally spaced-apart in the X-direction indicated on the figures and, in different examples, may or may not be in physical contact with one another while still being laterally spaced-apart. Further, conveyor 12 is illustrated as extending longitudinally in the Y-direction indicated on the figures. In operation, processing stations 16 can move relative to conveyor 12, e.g., in the positive and negative X-direction indicated on the figures, to move into and out of alignment with conveyor 12. In some examples, the distance separating each processing station 16 from each adjacent processing station is substantially fixed, and/or all processing stations 16 can move together while maintaining fixed separation distances between processing stations. In other examples, including the example illustrated in FIGS. 1 and 2, each processing station 16 is independently movable relative to each adjacent processing station. When so configured, the distance separating each processing from each adjacent processing station can expand and/or contract during operation, as the processing stations move relative to conveyor 12.

As one exemplary operation of system 10, ingress conveyor section 12A can be operated to load glazing panes and one or more glazing spacers into processing station 16B by conveying the components in the negative Y-direction indicated on FIGS. 1 and 2A. Once loaded, processing station 16B can move in the negative X-direction indicated on the figures toward processing station 16C, reducing the distance separating processing stations 16B and 16C. Concurrently or subsequently, processing station 16A can move in the negative X-direction indicated on the figures into alignment with conveyor 12 for loading and/or unloading, as shown in FIG. 2B. Once loaded, processing stations 16A, 16B, and 16C can all move in the positive X-direction indicated on the figures until processing station 16C is in alignment with conveyor 12 for loading and/or unloading, as shown in FIG. 2C. After loading processing station 16C with glazing unit components, processing station 16B and 16C can move in the negative X-direction indicated on the figures until processing station 16B is again aligned with conveyor 12, as shown in FIG. 2A. At this point in the manufacturing process, processing station 16B can discharge a multiple-pane insulating glazing unit that was fabricated while the processing station was moving relative to conveyor 12, e.g., to load and unload processing stations 16A and 16C. Processing station 16B can discharge the multiple-pane insulating glazing unit by operating egress conveyor section 12B to convey the glazing unit in the negative Y-direction indicated on FIGS. 1 and 2A. Simultaneous with unloading processing station 16B or subsequent thereto, ingress conveyor section 12A can load another set of glazing panes and one or more glazing spacers into the processing station 16B, restarting the sequence described above.

To facilitate relative movement between processing stations 16 and conveyor 12, system 10 can include a transport system. In the examples of FIGS. 1 and 2, system 10 includes transport system 18. Transport system 18 may include at least one rail which, in the illustrated example is shown as a plurality of rails 20, along which processing stations 16 travel to move relative to conveyor 12. Each processing station 16 may have transport wheels positioned underneath the processing station, e.g., and on the rails. The transport wheels in such an example can roll along the rails to move the processing station relative to conveyor 12. In other examples, each processing station 16 may have a continuous track (e.g., tank tread) and/or wheels that rolls along a surface (e.g., ground) on which the processing stations reside.

Figure 3:
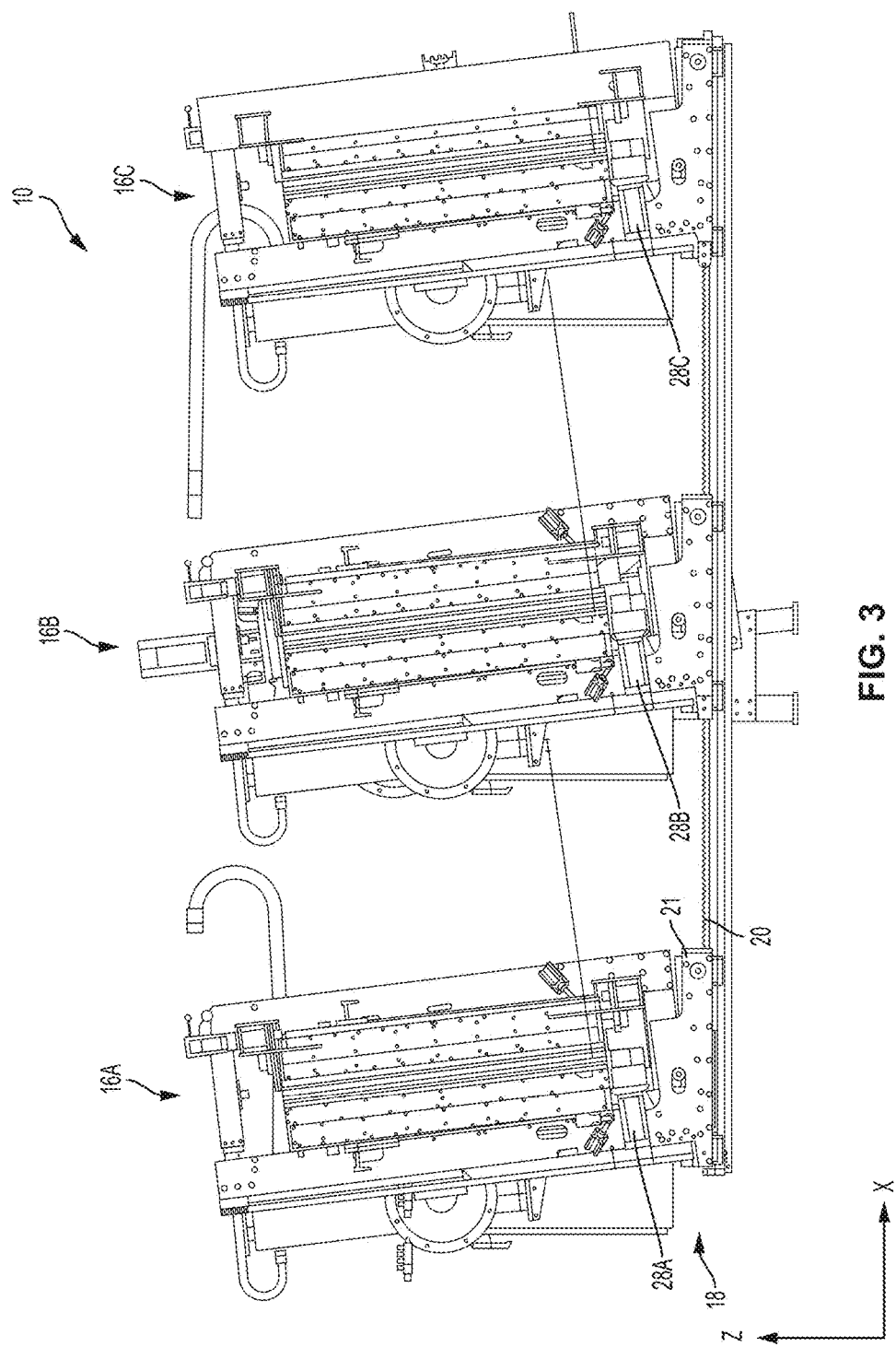
FIG. 3 is a partial side view of the example system of FIGS. 1 and 2 taken along the A-A cross-sectional line indicated on FIG. 2A.

FIG. 3 is a partial cross-sectional image of system 10 taken along the A-A cross-sectional line indicated on FIG. 2A. As shown in this example, transport system 18 of system 10 includes a rail 20 having teeth arranged along an upper surface of the rail. Each processing station 16 has an engagement section 21 coupling the processing station to this rail 20. In some examples, the transport system includes two or more rails 20. When provided, the rails 20 can optionally extend parallel to each other and cross-wise (e.g., perpendicular) to the longitudinal axis of the conveyor. For example, the rails 20 may be arranged traverse to conveyor 12 to provide pathways along which processing stations 16 move transversely relative to the conveyor. In operation, engagement section 21 can mechanically engage with the teeth running along the rails so as to move the processing station along the rails. In various examples, transport system 18 may utilize a screw drive, pneumatic piston, hydraulic piston, or other type of powered driver to drive movement of processing stations 16 relative to conveyor 12. Thus, all of the processing stations 16 may be configured to move along a path of machine travel extending cross-wise (e.g., perpendicular) to the longitudinal axis of the conveyor.

In addition, although processing stations 16 in the example of FIG. 3 are shown as translating along rail 20 of a shared transport system 18, in other examples, each processing station may have its own transport system. For example, each processing station 16 may have driven wheels under the processing station that roll along the ground to move the processing station relative to conveyor 12. Such a configuration can provide each processing station 16 with an independent transport system for transporting the station relative to conveyor 12. Other configurations for providing relative movement between processing stations 16 and conveyor 12 are possible and contemplated. For example, instead of configuring processing stations 16 to move relative to a stationary conveyor 12, in other examples, conveyor 12 may be configured to move relative to processing stations 16 while the processing stations remain stationary. In such a configuration, ingress conveyor section 12A and/or egress conveyor section 12B can be mounted on transport systems, such as rails or wheels, to allow the conveyor sections to move relative to processing stations 16. In one example of such a configuration, the ingress conveyor section 12A and/or egress conveyor section 12B can move transversely relative to stationary processing stations 16. In another example of such a configuration, the ingress conveyor section 12A and/or egress conveyor section 12B may be pivotable relative to processing stations 16. Pivoting the conveyor section about a pivot location can cause the conveyor section to rotate into alignment with any desired one of the processing stations. For instance, ingress conveyor section 12A may be pivotable about its upstream end such that by pivoting the conveyor section appropriately the downstream end of the conveyor section can be moved into alignment selectively with any desired one of the processing stations. Likewise, egress conveyor section 12B may be pivotable about its downstream end such that by pivoting the conveyor section appropriately the upstream end of the conveyor section can be moved into alignment selectively with any desired one of the processing stations.

System 10 can have yet additional configurations that provide conveyance pathways between processing stations 16 and conveyor 12. In other examples, for instance, system 10 can be configured so processing stations 16 and conveyor 12 do not move relative to each other during operation. In one such configuration according to these examples, ingress conveyor section 12A and/or egress conveyor section 12B may each include a number of conveyor braches that correspond to the number of processing stations 16 in system 10. For example, ingress conveyor section 12A may have a single inlet conveyor that branches into separate conveyor lines downstream of the single conveyor, where each conveyor branch corresponds to a different one of the plurality of laterally spaced-apart processing stations. Similarly, egress conveyor section 12B may have multiple conveyor branches that converge into a single outlet conveyor downstream of the multiple conveyor branches, where each conveyor branch corresponds to a different one of the plurality of laterally spaced-apart processing stations. When configured as shown in FIGS. 2A-2C, ingress conveyor section 12A may have a single inlet conveyor that branches into three separate conveyor lines corresponding to processing stations 16A, 16B, and 16C, respectively. Egress conveyor section 12B may similarly have three separate conveyor lines corresponding to processing stations 16A, 16B, and 16C that converge into a single outlet conveyor.

If desired, ingress conveyor section 12A can include, or be, a pane flipper (or, in other examples the flipper can be upstream from the ingress section). When used, the flipper can be configured to rotate the orientation of a glazing pane by 180 degrees before the pane is delivered into system 10 and/or machine 14. This can involve, for example, a section of conveyor (e.g., located at the bottom of two confronting platens bounding between them a conveyance gap), that is rotatable about a vertical axis. This may be desirable when one or more of the panes to be delivered into the machine have a coating (e.g., a low-emissivity coating). For example, if a pane is conveyed along the line with its coated surface facing out (e.g., away from the conveyor 12A), then it may be necessary to use the flipper to rotate the coated pane by 180 degrees, so that when it enters the machine, the coated surface is positioned appropriately for being assembled so as to be the #2 surface of the resulting multiple-pane insulating glazing unit. By providing the flipper, the system can be particularly flexible in assembling different unit types, e.g., double or triple pane units with different coatings on specific surfaces. Thus, certain embodiments provide the present system with a flipper upstream from a machine that is configured to assemble multiple-pane insulating glazing units of at least two types, e.g., double and triple pane units.

During operation of system 10 in FIGS. 1 and 2, glazing panes and glazing spacers can be transported from a storage area and loaded onto ingress conveyor section 12A (directly or via an upstream conveyor line section) and/or pane flipper. With a specific processing station aligned with ingress conveyor section 12A, the conveyor section can be operated to transport glazing panes and one or more glazing spacers along the conveyor into the aligned processing station. In some configurations, ingress conveyor section 12A conveys glazing panes and one or more glazing spacers directly into a processing station. For example, as discussed in greater detail with respect to FIGS. 4-7, each processing station 16 can have a pair of platens that define a processing zone therebetween. Ingress conveyor section 12A may convey glazing panes and one or more glazing spacers directly between two platens of the processing station in such an example without first conveying the components through an intermediate staging area. In other configurations, however, such as the configuration illustrated in FIGS. 1 and 2, machine 14 includes at least one staging station positioned between processing stations 16 and ingress conveyor section 12A.

In the example shown in FIGS. 1 and 2, machine 14 of system 10 has multiple staging stations. The illustrated machine has three staging stations 22A, 22B, 22C (referred to as "staging station 22" when describing an individual station or "staging stations 22" when describing all stations). The machine 14 can alternatively have fewer (e.g., two) or more staging stations. Typically, there is the same number of staging stations as there are processing stations. Staging stations 22 are illustrated in FIGS. 1 and 2 as being laterally spaced-apart in the X-direction indicated on the figures, with each staging station being associated with (e.g., coupled to) a corresponding processing station 16. In particular, staging station 22A is associated with processing station 16A, staging station 22B is associated with processing station 16B, and staging station 22C is associated with processing station 16C. Each illustrated staging station can move concurrently with and to the same extent as its corresponding processing station. For example, during operation in which processing stations 16 move transversely relative to conveyor 12 (e.g., in the positive and negative X-directions as shown in FIGS. 2A-2C), staging stations 22 may move conjointly with the processing stations relative to the conveyor.

When used, each staging station 22 may provide a station that receives glazing unit components from conveyor 12 and holds the components for delivery to a corresponding processing station. Each staging station 22 can be positioned between (optionally directly between, i.e., with no other station therebetween) conveyor 12 and a corresponding processing station 16. In some examples, each staging station can receive and hold two or more (e.g., three or more) glazing panes and one or more (e.g., two or more) glazing spacers. For example, during operation of system 10, a particular staging station 22 and its associated processing station 16 can move into alignment with ingress conveyor section 12A. The particular staging station 22 and its associated processing station 16 can move together and transversely relative to stationary ingress conveyor section 12A. Once aligned, the conveyor can convey two or more glazing panes and one or more glazing spacers onto the staging station 22. While still aligned with ingress conveyor section 12A or after moving out of alignment with the conveyor section, staging station 22 can deliver (e.g., convey) the two or more glazing panes and one or more glazing spacers into its associated processing station 16 for fabrication of the multiple-pane insulating glazing unit.

To receive and hold glazing unit components from conveyor 12, each staging station 22 may have a conveyance device and a structure to hold glazing unit components. In the example of FIGS. 1 and 2, each staging station 22 has a platen 24A, 24B, 24C (FIG. 1) (collectively "platen 24") and a conveyance line 26A, 26B, 26C (FIG. 2) (collectively "conveyance line 26"). Platen 24 may be a generally flat, plate-like structure that is generally vertically oriented such that a planar glazing pane can rest against the platen. Conveyance line 26 can be positioned adjacent a lower edge of platen 24. In use, conveyance line 26 of one of staging stations 22 can be moved into alignment with ingress conveyor section 12A such that the conveyance line and the ingress conveyor section are co-linear. When so positioned, ingress conveyor section 12A can be operated to convey glazing unit components onto conveyance line 26 of the staging station and the conveyance line can be further operated, e.g., to convey the glazing unit components along the length of the staging station and/or into a corresponding processing station 16.

When used, the processing station and staging station of each coupled pair may have separate, independently operable conveyor lines. When so configured, the conveyor line of the processing station can thus be operated while the conveyor line of the corresponding staging station 22 is stationary. When each processing station 16 and staging station 22 are provided with independently operable conveyor lines, the end of the conveyor line of a given staging station can be located sufficiently close to the beginning of the conveyor line of the corresponding processing station such that glazing panes can be conveyed from the staging conveyor onto the processing conveyor. For example, the end of the conveyor line of a given staging station may be less than 1 meter (m) from the beginning of the conveyor line of the corresponding processing station, such as less than 0.5 m, less than 0.25 m, or less than 0.1 m. An example of this type of arrangement is perhaps best appreciated with reference to FIG. 6, where it can be seen that the downstream end of the staging conveyor 26 is aligned with and directly adjacent to the upstream end of the corresponding processing conveyor 58. In other embodiments, it may be possible to provide a single conveyor line servicing both the staging station 22 and processing station 16.

To help facilitate loading of platen 24 on each staging station 22, the platen may have a plurality of holes spread across its face through which air is discharged. This can provide an air cushion between the face of the platen and a planar glazing pane being loaded or held on the platen. Further, to prevent a planar glazing pane from falling off the platen, the platen may be angled (e.g., at a non-zero degree angle, such as an acute angle less than 10 degrees) relative to a vertically extending axis perpendicular with the ground on which the platen is positioned.

Independent of whether system 10 does or does not include staging stations 22, conveyor 12 can be loaded with glazing unit components and can deliver the components to processing stations 16, e.g., either directly or indirectly by way of staging stations 22 and/or other intermediate stations. To facilitate loading and unloading, each processing station 16 can have its own conveyance line that helps convey glazing unit components into the processing station and a fabricated multiple-pane insulating glazing unit out of the processing station. In the example of FIG. 3, for instance, processing stations 16 include conveyance lines 28A, 28B, 28C (collectively "conveyance lines 28"). As described in greater detail below with respect to FIG. 8, each conveyance line 28 is positioned adjacent a lower region of a respective processing station. In use, conveyance line 28 of one of processing stations 16 can be moved into alignment with ingress conveyor section 12A, e.g., such that the conveyance line and the ingress conveyor section are co-linear so that glazing components can travel along the ingress conveyor section and onto the conveyance line of the processing station. Where a staging station 22 with its own conveyance line 26 is positioned between a processing station 16 and ingress conveyor section 12A, the conveyance line 28 of the processing station may be positioned co-linearly with the conveyance line 26 of the staging station which, in turn, is positioned co-linearly with the ingress conveyor section. This arrangement can allow a glazing pane to travel along ingress conveyor section 12A, along conveyance line 26 of the staging station, and into a processing station 16 via conveyance line 28. Once a fabricated multiple-pane insulating glazing unit is ready to be discharged from one of processing stations 16, the conveyance line 28 of the processing station can be aligned with egress conveyor section 12B, e.g., such that the conveyance line and the egress conveyor section are co-linear so that the multiple-pane insulating glazing unit can travel along the conveyance line 28 and onto the egress conveyor section 12B.

Structures described as being conveyors (e.g., ingress conveyor section 12A, egress conveyor section 12B) and conveyance lines (e.g., staging station conveyance line 26, processing station conveyance line 28) can be implemented using any suitable mechanical apparatuses for conveying components from one place to another place. Example devices that can be used include, but are not limited to, roller conveyors, chain conveyors, slat conveyors, flat belt conveyors, and combinations thereof. In one example, ingress conveyor section 12A, egress conveyor section 12B, conveyance lines 26, and conveyance lines 28 each comprise belt conveyors. Each belt conveyor may have one or more driven rollers and one or more idler rollers conveying a belt in an endless loop. During use, an edge of a glazing pane can be positioned adjacent to and in contact with an upper surface of the belt, causing the glazing pane to advance in the same direction and at the same rate as the belt.

System 10 in the example of FIGS. 1-3 has three processing stations 16 that move transverse or crosswise relative to a single stationary ingress conveyor section 12A and a single stationary egress conveyor section 12B. In particular, in the example of system 10, the three processing stations 16 along with their corresponding optional staging stations 22 move along a transverse axis 30 (FIG. 2A), which typically is substantially perpendicular to (e.g., at or near 90 degrees with) a longitudinal axis 32 along which conveyor 12 extends. In other configurations, processing stations 16 and conveyor 12 can be at non-perpendicular, cross-wise angles with respect to each other. Further, although example system 10 has a single ingress conveyor section 12A, a single egress conveyor section 12B, and three processing stations 16, a system in accordance with the disclosure can include a different number or configuration of conveyor sections and/or processing stations. For instance, in other examples, system 10 may include fewer processing stations 16 (e.g., two processing stations) or more processing stations (e.g., four, five, or more), and the disclosure is not limited in this respect. Additionally or alternatively, the longitudinally extending conveyor line can optionally include, or be, a flipper of the nature described above.

Configuring system 10 with multiple processing stations 16 can increase the rate or cycle time with which the system produces multiple-pane insulating glazing units, e.g., as compared to alternative multiple-pane insulating glazing unit fabrication systems. While the production speed of system 10 can vary, in some examples, machine 14 of system 10 has a cycle time that yields a fabricated multiple-pane insulating glazing unit at an average rate of less than 1 minute per unit, such as less than 45 second per unit, less than 30 second per unit, or less than 25 seconds per unit. The average rate can be measured over a given period of time (e.g., 5 minutes, 1 hour, an 8 hour shift, 12 hours, 1 day). Machine 14 may discharge a new multiple-pane insulating glazing unit onto egress conveyor section 12B at any of these foregoing rates. Further, the units produced at any of these foregoing rates may be comparatively simple units, such as standard sized and shaped double-pane insulating glazing units. Additionally or alternatively, system 10 may produce more complex units at any of these foregoing rates. For example, machine 14 and system 10 may produce triple-pane insulating glazing units at any of the foregoing rates. As another example, machine 14 and system 10 may produce custom sized and/or shapes units at any of the foregoing rates (e.g., where at least one and optionally all multiple-pane insulating glazing units produced during the given period of time has a different size and/or shape than at least one and optionally all other multiple-pane insulating glazing units produced during the given period of time).

Figure 4:
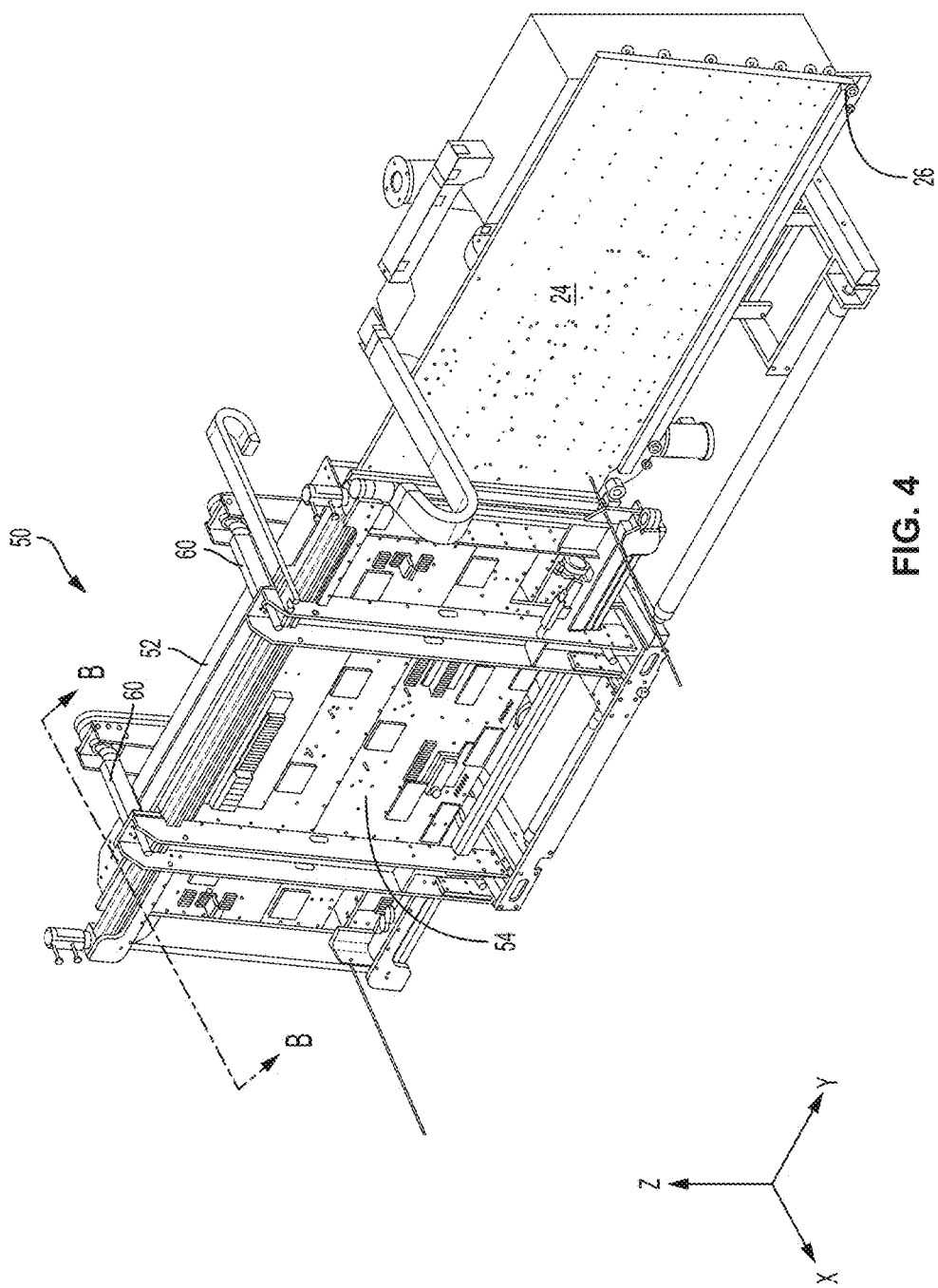
FIG. 4 is a perspective view of an example processing station and staging station that can be used in the example system of FIGS. 1 and 2.
Figure 5:
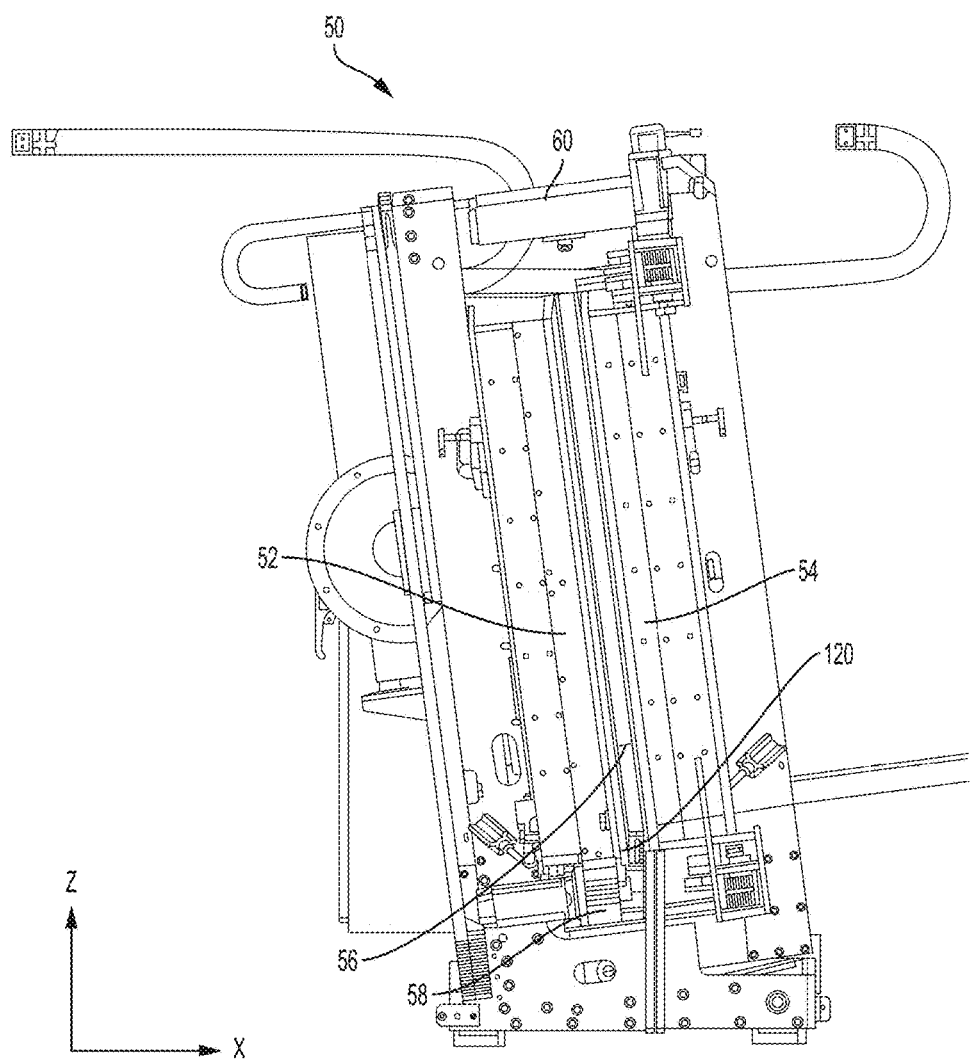
FIG. 5 is a side view of the example processing station of FIG. 4 taken along the B-B line indicated on FIG. 4.

As discussed above, machine 14 in FIGS. 1 and 2 includes multiple processing stations 16 that are configured to receive glazing panes and one or more glazing spacers and fabricate therefrom a multiple-pane insulating glazing unit. FIG. 4 is a perspective view of an example processing station 50 and a corresponding staging station 24 that can be used in system 10 (FIGS. 1-3). FIG. 5 is a side view of processing station 50 taken along the B-B line indicated on FIG. 4. Processing station 50 in FIGS. 4 and 5 can be used for each of processing stations 16 in system 10 or in different applications, such as a standalone machine that is not part of a system having multiple processing stations that move relative to a conveyor.

As shown in FIGS. 4 and 5, the example processing station 50 has a first platen 52 and a second platen 54 that define a processing zone 56 between the two platens. Processing station 50 also includes a conveyor line 58 positioned adjacent a lower region of first platen 52. Conveyor line 58 can be constructed and can function in the same general manner as conveyance line 28 when processing station 50 is implemented in system 10, as described above. In operation, conveyor line 58 can convey two or more (e.g., three or more) glazing panes and one or more glazing spacers into processing zone 56. Once inside of processing zone 56, the glazing unit components can be arranged relative to one another so that one glazing pane is generally parallel to and spaced apart from another glazing pane. For example, one glazing pane can be positioned in contact with first platen 52 while a second glazing pane can be positioned in contact with second platen 54. One of the glazing panes can have a spacer adhered about the perimeter. The spacer may have a compressible sealant on opposed sides, with a sealant bead on one side of the spacer pressed against a glazing pane carrying the spacer and a sealant bead on the other side of the spacer facing, but spaced from, an opposed glazing pane. A space between the two glazing panes can be filled with an insulative gas inside of processing station 50 and the two glazing panes pressed together, pressing the spacer against the opposed glazing pane. This can press the sealant bead on the exposed face of the spacer against the opposed glazing pane, thereby sealing the insulative gas between the glazing panes.

To facilitate loading and unloading of processing zone 56, first platen 52 and second platen 54 can move relative to each other (e.g., toward or away from each other, in the positive and negative X-direction indicated on FIGS. 4 and 5) to open and close access to processing zone 56. During fabrication of a multiple-pane insulating glazing unit, a movable platen can also provide a pressing force to press opposed panes of a partially fabricated multi-pane insulating glazing unit together, thereby sealing an insulative gas between the opposed panes. When so configured, each platen can move independently toward or away from the other platen. Alternatively, in other examples, one platen can move toward or away from another platen that remains stationary. For instance, in the configuration of processing station 50 shown in FIGS. 4 and 5, first platen 52 is configured to remain stationary while second platen 54 is a movable platen configured to move toward and/or away from the stationary platen (e.g., in the negative and/or positive X-direction indicated on FIG. 5).

To load processing zone 56 with glazing unit components during operation of processing station 50, second platen 54 can move away from first platen 52 (e.g., in the positive X-direction indicated on FIG. 5), thereby expanding the width of processing zone 56. With processing zone 56 opened, two or more glazing panes and one or more glazing panes can be loaded into the processing zone by operating conveyor line 58. For example, conveyor line 58 can be operated to load into the processing zone 56 a first glazing pane, which is then positioned and held adjacent to second platen 54, followed by a second glazing pane, which is positioned and held adjacent to first platen 52 and in spaced-apart alignment with the first glazing pane. At least one of the two glazing panes can have a spacer adhered about its perimeter. With the glazing panes and glazing spacer loaded inside of processing zone 56 and retained in the noted positions, the second platen 54 can be moved toward the first platen 52 (e.g., in the positive X-direction indicated on FIG. 5) to close processing zone 56 for subsequent processing. In some examples, as discussed in greater detail below with respect to FIGS. 7 and 8, processing zone 56 may also be sealed to prevent gas loss during subsequent gas filling. In either case, second platen 54 may be moved toward first platen 52 a distance sufficient to provide a small space between a spacer adhered to one glazing pane and another glazing pane positioned opposite the spacer. After filling the space between the two glazing panes with insulative gas, second platen 54 can be moved farther toward the first platen 52 (e.g., farther in the positive X-direction indicated on FIG. 5) to press the spacer and adhere the spacer carried by one glazing pane against the opposed glazing pane, thereby sealing the insulative gas between the two panes with the spacer.

To control movement between first platen 52 and second platen 54, processing station 50 in the example of FIGS. 4 and 5 includes at least one driver 60, which in the illustrated configuration is shown as two drivers positioned at different positions along the length of the processing station. Driver 60 can be implemented using a linear actuator, such as a screw drive, a pneumatic piston, a hydraulic piston, or other type of powered driver to drive movement of second platen 54 toward and away first platen 52. In some examples, driver 60 is configured to move second platen 54 relative to first platen 52 such that the platens remain generally parallel to and spaced apart from each other throughout the entire range of travel. In such a configuration, the top and bottom edges of second platen 54 may each move the same distance towards or away from the top and bottom edges of first platen 52 during travel. In other examples, driver 60 is configured to move second platen 54 asymmetrically relative first platen 52. For example, driver 60 may move the top edge of second platen 54 a greater distance toward or away from the top edge of first platen 52 than the bottom edge of the second platen is moved toward or away from the bottom edge of the first platen. Such a configuration can cause processing station 50 to open in a "V" configuration for loading and unloading. Alternatively, driver 60 may move the bottom edge of second platen 54 a greater distance toward or away from the bottom edge of first platen 52 than the top edge of the second platen is moved toward or away from the top edge of the first platen. Such a configuration can cause processing station 50 to open in an inverted "V" configuration for loading and unloading. Other variations in which first platen 52 moves relative to second platen 54 can be used without departing from the scope of the disclosure.

To fabricate a multiple-pane insulating glazing unit using processing station 50, two or more glazing panes and one or more glazing spacers can be loaded into the processing zone 56. Once loaded into processing zone 56, a space between the two or more glazing panes can be filled with insulative gas and the glazing panes pressed together, sealing the insulative gas in a between-pane space sealed by a glazing spacer. To position and hold the glazing panes inserted into processing zone 56 in alignment with one another for gas filling and pressing, processing station 50 may include suction ports holding a glazing pane to a respective platen face. Further, to prevent gas loss during gas filling inside of processing station 50, the processing station may include seal devices sealing the side edges of processing zone 56.

Figure 6:
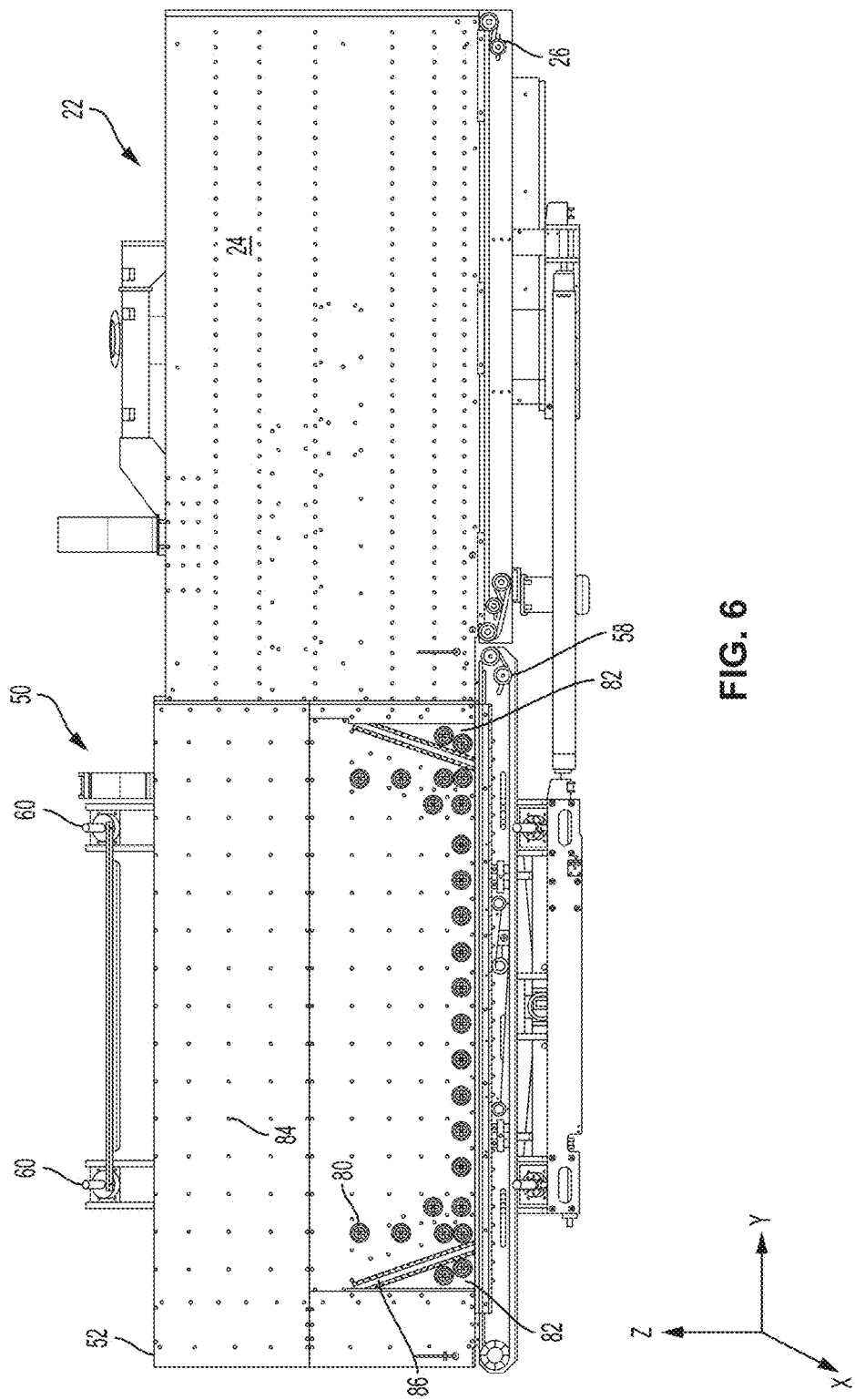
FIG. 6 is a front view of an example first platen that may be used in the example processing station of FIG. 4; also shown is the staging station of FIG. 4.

FIG. 6 is a front view of processing station 50 showing an example configuration of first platen 52 that may be used in the processing station. FIG. 6 illustrates previously-described first platen 52, conveyance line 58, and driver 60; also shown is optional staging station 22. First platen 52 is illustrated as being positioned co-planar with a platen 24 (FIGS. 1 and 2) of staging station 22 positioned upstream of processing station 50. Further, conveyor line 58 of processing station 50 is illustrated as being co-linearly aligned with conveyance line 26 of staging station 22, allowing glazing panes to travel from conveyance line 26 onto and along conveyor line 58. In other examples, as discussed above, processing station 50 can be used without staging station 22.

In the configuration of FIG. 6, first platen 52 includes a plurality of suction ports 80, a pair of movable sections 82, and a plurality of air ports 84. Suction ports 80 are configured to suction attach and hold a glazing pane to the face of first platen 52 for assembly of a multiple-pane insulating glazing unit. Air ports 84 provide openings through which air can be discharged while loading a glazing pane onto first platen 52. Movable sections 82 are portions of first platen 52 that are configured to move relative to a remainder of the face of the platen.

In use, a glazing pane can be loaded onto first platen 52 by activating conveyance line 26 of staging section 22 and further activating conveyor line 58 of processing station 50. As the conveyor lines are moving to transport a glazing pane along the length of the conveyor lines, air can be discharged through holes in the face of staging section platen 24 and/or air ports 84 of first platen 52. This can provide an air cushion separating the face of the glazing pane from the face of staging section platen 24 and/or first platen 52, allowing the glazing pane to move relative to the platens without scraping against the face of the platens. Once the glazing pane is positioned at a desired location along the length of first platen 52 (e.g., a desired position in the Y-direction indicated on FIG. 6), air can stop discharging through air ports 84 and conveyor line 58 can cease operation. The second platen 54 can then be moved toward the first platen 52 until suction ports 80 on the second platen (see FIG. 7) engage the pane to suction attach it to the second platen. The second platen 54, while holding the pane, can then be moved away from the first platen 32. A second pane can then be advanced along conveyor line 58 until reaching the desired location on the length of the first platen (at which point the two panes are aligned with, and spaced apart from, each other). Suction ports 80 can engage the second pane to suction attach the glazing pane to the face of first platen 52. In some examples, each suction port 80 has a suction cup through which a vacuum is drawn, holding the glazing pane to the suction cup. The spacer will typically be adhered to only one of the panes at this stage, providing a gap between the spacer and the opposed pane that does not carry the spacer.

With first and second glazing panes suitably positioned (e.g., retained) against first platen 52 and second platen 54, respectively, inside of processing station 50, a space between the glazing panes can be filled with insulative gas. After gas filling the between-pane space, the glazing panes can be pressed together by advancing the first platen 52 and second platen 54 toward each other. In some example methods, this involves moving the pane spaced apart from the spacer into contact with sealant on the exposed side of the spacer. This pressing process can seal the insulative gas in the between-pane space of the multiple-pane insulating glazing unit. As the glazing panes are pressed together during fabrication, insulative gas may be compressed between the glazing panes and/or pressed out around the sides of the glazing panes as the space between the panes is reduced. To help ensure that the gaseous atmosphere between the glazing panes is appropriately vented and gas bubbles are not formed during fabrication of the multiple-pane insulating glazing unit, one option is for first platen 52 to include movable sections 82.

Each movable section 82 can be a section or segment of first platen 52 that is configured to move (e.g., pivot) into and/or out of the plane of the remainder of the first platen (e.g., in the negative and/or positive X-direction indicated on FIG. 6). Each movable section 82 may have a joint 86, which may or may not be hinged, about which the movable section rotates. In addition, each movable section 82 may have a suction port 80 (optionally at least two suction ports 80) for suction attaching a glazing pane to the movable section. During fabrication of a glazing unit, movable section 82 can be retracted into the face of first platen 52, pulling the section of a glazing pane attached to the movable section away from a remainder of the partially fabricated insulating glazing unit inside of processing station 50. The glazing pane attached to the movable section 82 can bend or flex in the region of movable section 82 without breaking. This can create an opening (by locally separating that pane from the spacer) through which the partially fabricated insulating glazing unit can vent gas as the glazing panes of the unit are pressed together. After pressing the glazing panes together while holding a section of one of the glazing panes away from the remainder of the glazing unit, movable section 82 can release and/or push the section of the glazing pane attached to the movable section back toward the remainder of the insulated glazing unit, thereby completing the seal between the spacer and both of the panes carried against it.

First platen 52 can have any suitable number and arrangement of movable sections 82. In general, it is easier to bend a glazing pane for venting near a corner of the glazing pane than at the center of the glazing pane. For this reason, first platen 52 can have at least one movable section 82 arranged in a region of the platen where a corner of glazing pane would typically be positioned during fabrication of a multiple-pane insulating glazing unit. In the example of FIG. 6, each movable section 82 is a generally triangle-shaped section configured to correspond to a corner section of a glazing pane. The triangle-shaped section has a base that defines, or is adjacent to, a lower edge of first platen 52 in the region of the movable section and a hypotenuse of the triangle is hingedly attached to a remainder of the platen. In FIG. 6, first platen 52 has one movable section 82 positioned adjacent a leading or inlet end of processing station 50 and another movable section 82 positioned adjacent a trailing or outlet end of the processing station. In some examples, the leading and trailing movable sections 82 can be spaced apart from each other (e.g., in the Y-direction indicated on FIG. 6) a distance greater than 1 meter (m), such as a distance greater than 2 meters, a distance greater than 5 meters, or a distance greater than 10 meters.

Configuring first platen 52 with two separate movable sections 82 located respectively at the inlet end and outlet end of processing station 50 can be useful to enable the processing station to efficiently fabricate different dimensioned and/or shaped multiple-pane insulating glazing units. For example, having movable sections 82 adjacent both ends of processing station 50 can allow a manufacturer to insert panes of many different sizes and shapes into the processing station without requiring the panes to be specially rotated or oriented relative to certain features of the processing station. The multiple-pane insulating glazing unit being fabricated on processing station 50 can be vented either adjacent the leading edge of the processing station or the trailing edge of the processing station, e.g., depending on the configuration of the specific glazing unit being fabricated. As one example, if a manufacturer were constructing a triangular-shaped multiple-pane insulating glazing unit, the manufacturer could insert triangular-shaped glazing panes into processing station 50 without having to first rotate or flip the glazing panes to align a corner of a glazing pane with a movable section. Instead, the manufacturer can simply choose, based on the orientation of the triangle, whether to use the movable section 82 adjacent the inlet end or the movable section 82 adjacent the outlet end. This can increase the production efficiency of processing station 50.

First platen 52 can have any suitable number and arrangement of suction ports 80. In general, suction ports 80 can be arrayed across the length (e.g., in the Y-direction indicted on FIG. 6) and the height (e.g., in the Z-direction indicated on FIG. 6). This can enable a glazing pane to be suction attached at multiple locations across the face of first platen 52.

Figure 7:
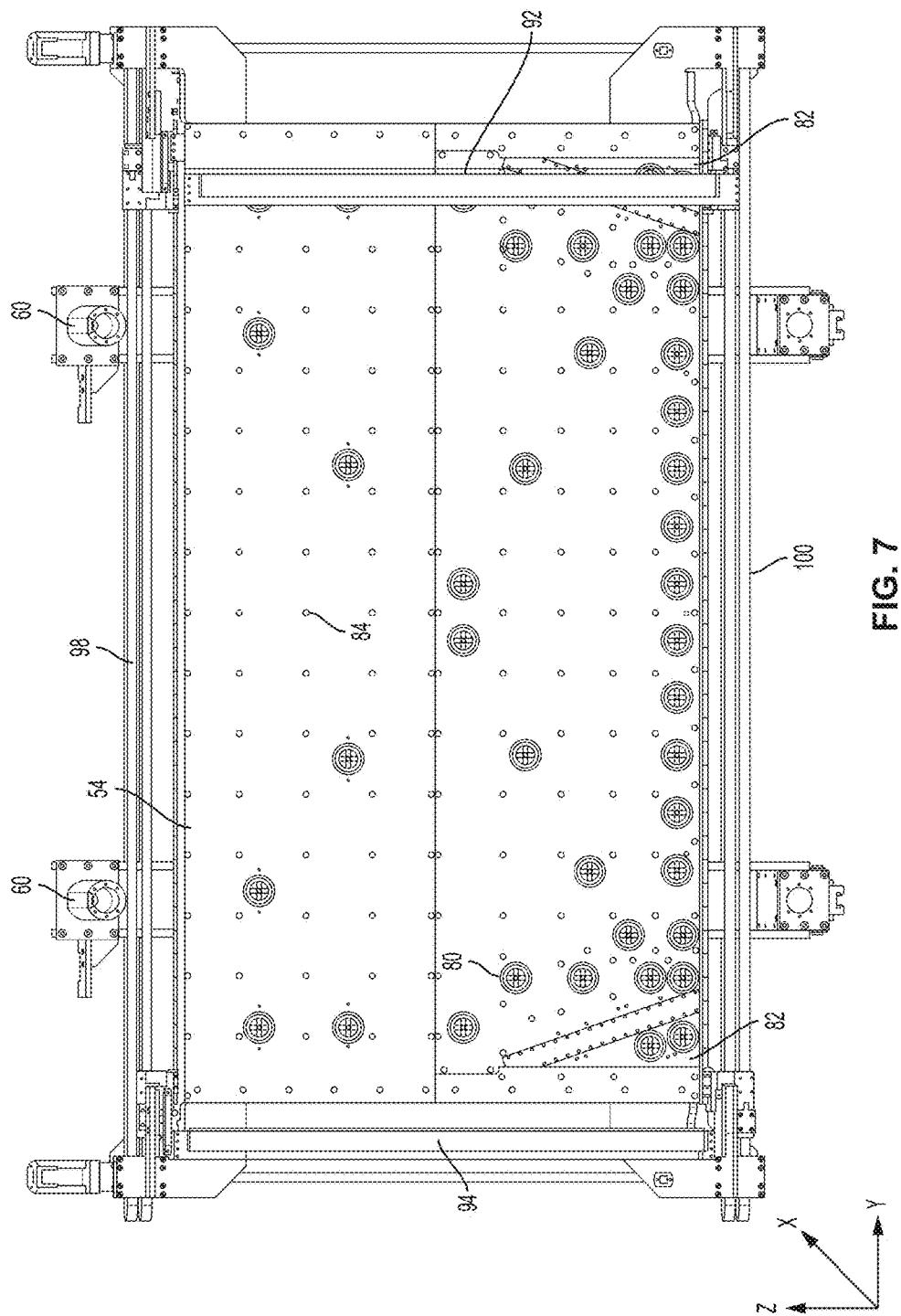
FIG. 7 is a front view of an example second platen that may be used in the example processing station of FIG. 4.

FIG. 7 is a front view of processing station 50 (FIGS. 4 and 5) showing an example configuration of second platen 54 that may be used in the processing station. In this example, second platen 54 includes a plurality of suction ports 80, two movable sections 82, and a plurality of air ports 84, as described above with respect to first platen 52 in FIG. 6. In operation, a glazing pane can be loaded onto second platen 54 by transporting a glazing pane along conveyor line 58 (FIGS. 5 and 6) until the glazing pane is positioned at a desired location along the length of second platen 54 (e.g., a desired position in the Y-direction indicated on FIG. 7). During this process, air can be discharged through air ports 84 of second platen 54, providing an air cushion separating the face of the glazing pane from the face of platen as the glazing pane is transported parallel to the platen. Once suitably positioned, air can stop discharging through air ports 84, the second platen 54 can be moved toward the first platen 52 until suction ports 80 on the second platen contact the pane, and then the suction ports 80 can suction attach the glazing pane to the face of second platen 54 for further processing. It should be appreciated that second platen 54 illustrated in FIG. 7 is merely one example of a platen that can be on processing station 50 and the disclosure is not limited in this respect.

In the example of FIG. 7, second platen 54 is illustrated as carrying a first movable seal 92 and a second movable seal 94. As briefly discussed above, it can be useful to seal the side boundaries of processing zone 56 (FIG. 5) during gas filling to minimize the amount of insulative gas required to fill an insulating glazing unit and/or to prevent excess gas loss out of the sides of processing station 50. First movable seal 92 and second movable seal 94 can function to seal the sides of processing station 50 and/or a gas fill chamber created within the processing station (e.g., in the Z-X plane indicated on FIG. 7). During fabrication of an insulating glazing unit, first movable seal 92 and second movable seal 94 may initially be positioned respectively at first and second sides of second platen 54, e.g., co-planar with or retracted relative to the face of the platen. This position can have the seals out of the way, e.g., to allow glazing panes to be conveyed into processing station 50 and/or a fabricated glazing unit to be discharged from the station without either seal interfering with transport into or out of the station. The second seal 94 is shown in FIG. 7 in such an initial holding position. After loading glazing panes into processing station 50 for fabrication of a multiple-pane insulating glazing unit, first movable seal 92 and second movable seal 94 can each swing around from their initial holding positions adjacent to second platen 54 to a sealing position between first platen 52 and second platen 54 (FIG. 4). The first seal 92 is shown in FIG. 7 after it has moved from its initial holding position to a location between the two platens 52, 54. Once the two seals 92, 94 have reached their desired positions between first platen 52 and second platen 54, the platens can move relative to each other (e.g., in the X-direction indicated on FIG. 7) until first movable seal 92 and second movable seal 94 are adjacent to and, in some examples in contact with, the first platen 52 on one side and the second platen 54 on the opposite side. For example, the platens may be moved relative to each other until first movable seal 92 and second movable seal 94 are compressed between the two platens.

Once first movable seal 92 and second movable seal 94 are moved to desired working positions and, optionally, compressed between the platens, the seals can delineate side boundaries of a gas chamber that is filled with insulative gas (e.g., a mix of argon and air) during fabrication of a glazing unit. For example, the movable seals may provide gas barriers substantially limiting the extent to which insulative gas can travel in processing zone 56 (FIG. 5) to the region bounded between the two seals and the two platens. This can help minimize the amount of insulative gas required to fill an insulating glazing unit and/or eliminate insulative gas loss out the sides of processing station 50 during fabrication of a multiple-pane insulating glazing unit.

First movable seal 92 and second movable seal 94 are configured to be moved longitudinally relative to first platen 52 and second platen 54 (e.g., in the Y-direction indicated on FIG. 7). In some examples, first movable seal 92 and second movable seal 94 can each move parallel to and between the faces of first platen 52 and second platen 54. The extent to which first movable seal 92 and second movable seal 94 can move along the length of first platen 52 and second platen 54 can vary, e.g., depending on the configuration of processing station 50 and the configuration(s) of multiple-pane insulating glazing units intended to be fabricated using the machine. In some examples, first movable seal 92 and second movable seal 94 are each configured to move the entire length of first platen 52 and/or second platen 54. When so configured, first movable seal 92 can move from being positioned at a leading side edge of second platen 54 along the entire length of the platen until the seal is positioned adjacent a trailing side edge of the platen. Likewise, second movable seal 94 can move from being positioned at a trailing side edge of second platen 54 along the entire length of the platen until the seal is positioned adjacent a leading side edge of the platen. In other examples, first movable seal 92 and second movable seal 94 may be configured to move less than the entire length of first platen 52 and/or second platen 54. For example, first movable seal 92 and second movable seal 94 may be configured to move from a leading edge and a trailing edge of second platen 54, respectively, to a position halfway between the leading edge and trailing edge of the platen. Other ranges of travel for first movable seal 92 and/or second movable seal 94 can also be used.

Independent of the specific distance first movable seal 92 and second movable seal 94 are configured to move, each seal can be moved to a desired working position along the length of first platen 52 and second platen 54 during fabrication of a particular multiple-pane insulating glazing unit. Typically, first movable seal 92 and second movable seal 94 are positioned in close proximity to the edges of the glazing panes inserted into processing station 50, e.g., with or without contacting the edges of the glazing panes. Depending on the configuration of the glazing unit being fabricated using processing station 50, the individual panes of the glazing unit may be inserted into the station such that a side edge of each glazing pane is adjacent to and in registration with a leading edge of the processing station, a trailing edge of the processing station, or at a desired location between the leading edge and trailing edge of the processing station. Accordingly, the extent to which first movable seal 92 and second movable seal 94 need to translate along the length of processing station 50 may vary depending on where glazing panes are positioned within the processing station. In examples in which glazing panes are positioned adjacent to and in registration with one of the edges of processing station 50, a movable seal positioned on the opposite edge of the processing station may move a greater distance before reaching its desired working position than does the seal closest to the registration edge of the glazing pane.

Providing processing station 50 with a pair of movable seals 92, 94 can be useful for a variety of reasons. In general, processing station 50 may be sized to process the largest glazing panes, and the largest multiple-pane insulating glazing units, expected to be fabricated by a manufacturing facility. In practice, however, many multiple-pane insulating glazing units actual fabricated by the facility may be smaller than the largest possible multiple-pane insulating glazing units. If processing station 50 were not configured with both movable seals 92, 94, the entire space between first platen 52 and second platen 54 may need to be filled with insulative gas during fabrication of a glazing unit, including those regions of the processing station not occupied by glazing pane material. In addition to wasting gas, gas filling is often one of the most time consuming task during glazing unit fabrication, necessitating additional cycle time. By configuring processing station 50 with two movable seals, the seals can move to define a gas filling chamber between first platen 52 and second platen 54 more closely corresponding to the actual size of the insulating glazing unit being fabricated. This can provide faster cycling times and minimize insulative gas consumption during fabrication.

In addition, configuring processing station 50 with a pair of movable seals 92, 94 instead of only one movable seal may be useful to enable processing station 50 to efficiently fabricate different dimensioned and/or shaped multiple-pane insulating glazing units. For example, having movable seals 92, 94 that can translate from opposite sides of the processing station 50 can allow a manufacturer to process glazing panes of many different sizes and shapes in the processing station without requiring the panes to be specially rotated or oriented relative to certain features of the processing station. This can increase the production efficiency of processing station 50.

First movable seal 92 and second movable seal 94 may be fabricated from a gas impermeable material and, in different examples, may or may not be fabricated from an elastically compressible material. As one example, first movable seal 92 and second movable seal 94 may each be fabricated from a closed-cell foam or rubber substantially impermeable to an insulative gas intended to be dispensed inside of processing station 50. In some examples, first movable seal 92 and second movable seal 94 each have a vertically elongated body (e.g., extending in the Z-direction indicated on FIG. 7) that connects to a drive unit configured to move the seals along a length of processing station 50. Each such vertically elongated body can optionally be formed of an elastically compressible material, such as a closed-cell foam.

In the example of FIG. 7, second platen 54 of processing station 50 carries a pair of upper drive belts 98 and a pair of lower drive belts 100. First movable seal 92 is attached to one upper drive belt 98 and one lower drive belt 100. Second movable seal 94 is attached to a different one of the upper drive belts 98 and a different one of the lower drive belts 100. During use, an upper drive belt 98 and a lower drive belt 100 translate along the length of processing station 50 to drive first movable seal 92 from a side edge of second platen 54 to a desired working position along the length of processing station 50 between the first and second platens and back to the side edge of the second platen. Likewise, an upper drive belt 98 and a lower drive belt 100 translate along the length of processing station 50 to drive second movable seal 94 from a side edge of second platen 54 to a desired working position along the length of processing station 50 between the first and second platens and back to the side edge of the second platen. First movable seal 92 and second movable seal 94 can move simultaneously together or can move independently and sequentially.

In some examples, upper drive belts 98 and lower drive belts 100 are adapted to move first movable seal 92 and second movable seal 94, respectively, between side edges of processing station 50 and any one of a plurality of discrete locations along a limited portion of the length of the processing station. In other examples, upper drive belts 98 and lower drive belts 100 are configured to move first movable seal 92 and second movable seal 94 to any position along the length of the processing station, such that the positioning of the first movable seal and/or second movable seal is infinitely variable along the length of the processing station.

While FIG. 7 illustrates one example configuration of second platen 54, it should be appreciated that other configurations are possible and the disclosure is not limited in this respect. For example, although FIG. 7 illustrates a movable platen 54 carrying first movable seal 92 and second movable seal 94, in other examples, one or both of the seals can be carried by a stationary platen 52 instead of movable platen 54. Further, although FIG. 7 illustrates first movable seal 92 and second movable seal 94 as each being attached to an upper drive belt and lower drive belt, in other examples, each movable seal may only be attached to a single drive belt (e.g., an upper drive belt or lower drive belt) instead of two drive belts. Other drive means can also be used.

As noted above, processing station 50 can fill a space between first platen 52 and second platen 54 with insulative gas during fabrication of a multiple-pane insulating glazing unit. To fill a space between the platens with insulative gas, processing station 50 can have a gas fill device that provides controlled gas communication between an insulative gas source and an interior of the processing station. In aspects of the processing station, any suitable gas fill device can be used. In various examples, processing station 50 can have a single gas nozzle or multiple gas nozzles that deliver insulative gas from the bottom of the processing station, the sides of the processing station, and/or the top of the processing station. Oftentimes, the insulative gas used to fill insulating glass units (e.g., argon, krypton) is heavier than ambient air, causing the insulative gas to fall to, or otherwise occupy, a low elevation location inside of processing station 50. By configuring processing station 50 with a gas fill device that delivers insulative gas to a bottom region of the processing station, the gas injected using the gas fill device may upwardly displace lighter air while avoiding excessive or uncontrolled mixing of the insulative gas and ambient air.

Figure 8:
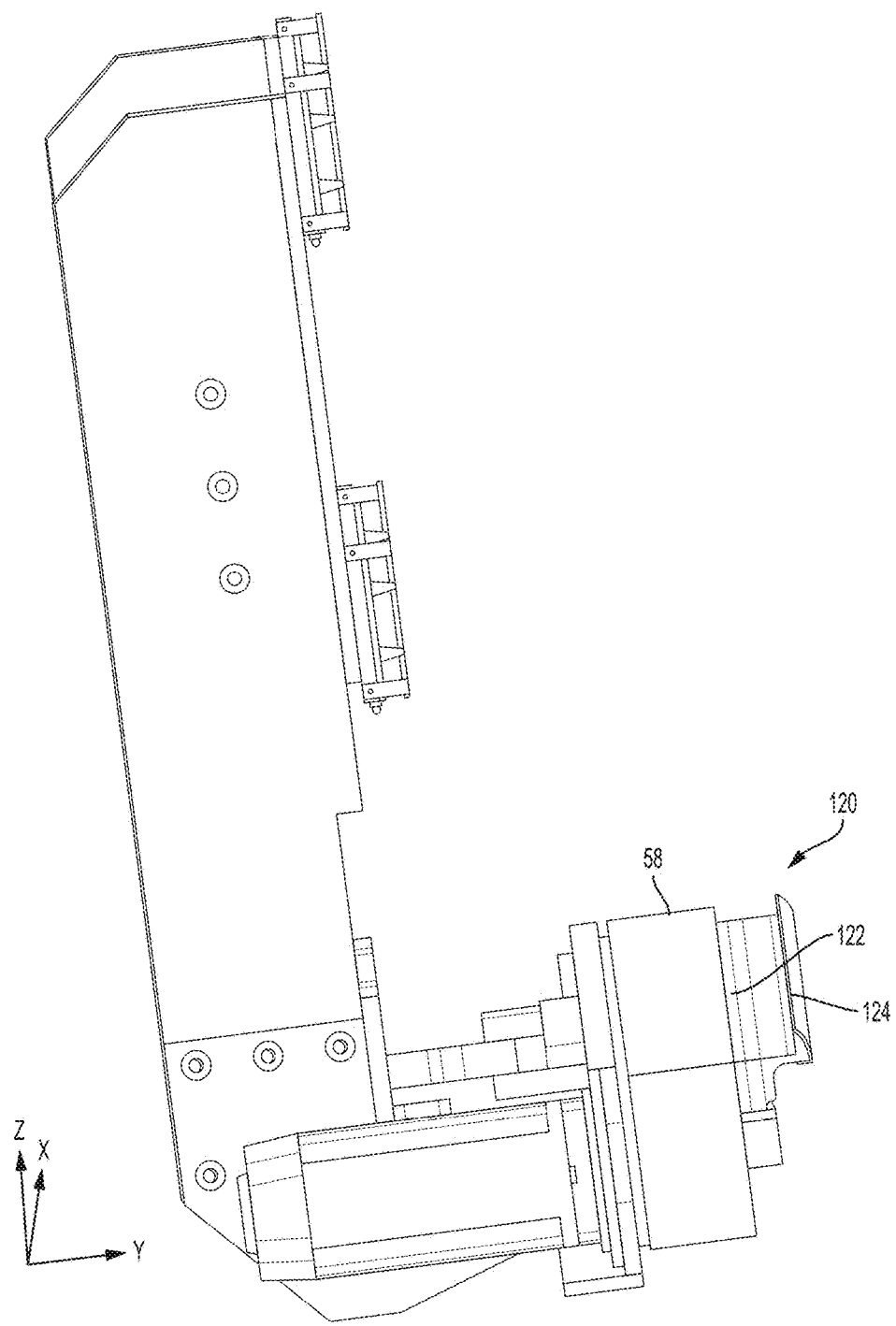
FIG. 8 is an illustration of an example gas fill device that can be used on the example processing station of FIG. 4; also shown is the first platen and conveyance system of the processing station of FIG. 4.

FIG. 8 is an illustration of an example gas fill device 120 that can be used on processing station 50 (FIGS. 4 and 5). As shown, gas fill device 120 in this example defines a longitudinally elongated manifold (e.g., longitudinally elongated in the Y-direction indicated on FIG. 8) positioned adjacent (e.g., mounted alongside) conveyor line 58. Gas fill device 120 may be longitudinally elongated in that it can have a length parallel to the face of platens 52, 54 greater than (optionally more than ten times) its width orthogonal to the face of the platens. Gas fill device 120 has at least one gas fill port 122 configured to deliver insulative gas into processing station 50. During use, gas fill device 120 can be positioned underneath the processing zone 56 defined between first platen 52 and second platen 54 (FIG. 5). For example, gas fill device 120 can be positioned underneath processing zone 56 such that one or more gas ports 122 of the device open vertically upward and direct insulative gas upwardly into a space established between one glazing pane held to first platen 52 and another glazing pane held to second platen 54.

The specific configuration of the one or more gas fill ports 122 used on gas fill device 120 can vary. In some examples, gas fill device 120 has a single gas fill port 122. The single gas fill port may be a longitudinally elongated opening, e.g., having a length in the Y-direction indicated on FIG. 7 greater than (optionally more than ten times) its width in the X-direction indicated on the figure. In other examples, gas fill device has multiple gas fill ports 122, e.g., spaced at regular or irregular intervals along the length of gas fill device 120. Each gas fill port in such an example may or may not be a longitudinally elongated opening. As one example in accordance with this configuration, gas fill device 120 may have gas fill ports arranged at regular intervals (e.g., between every 1 inch and every 6 inches, such as every 3 inches) along the entire length of processing zone 56. Each gas fill port may be an elongated slot having a length ranging from 0.25 inches to 6 inches, such as 1 inch to 4 inches, and a width less than 3 inches, such a width less than 1 inch, less than 0.5 inches, or less than 0.25. This is merely one example, however, and other sizes and shapes of gas ports can be used without departing from the scope of the disclosure.

Figure 9:
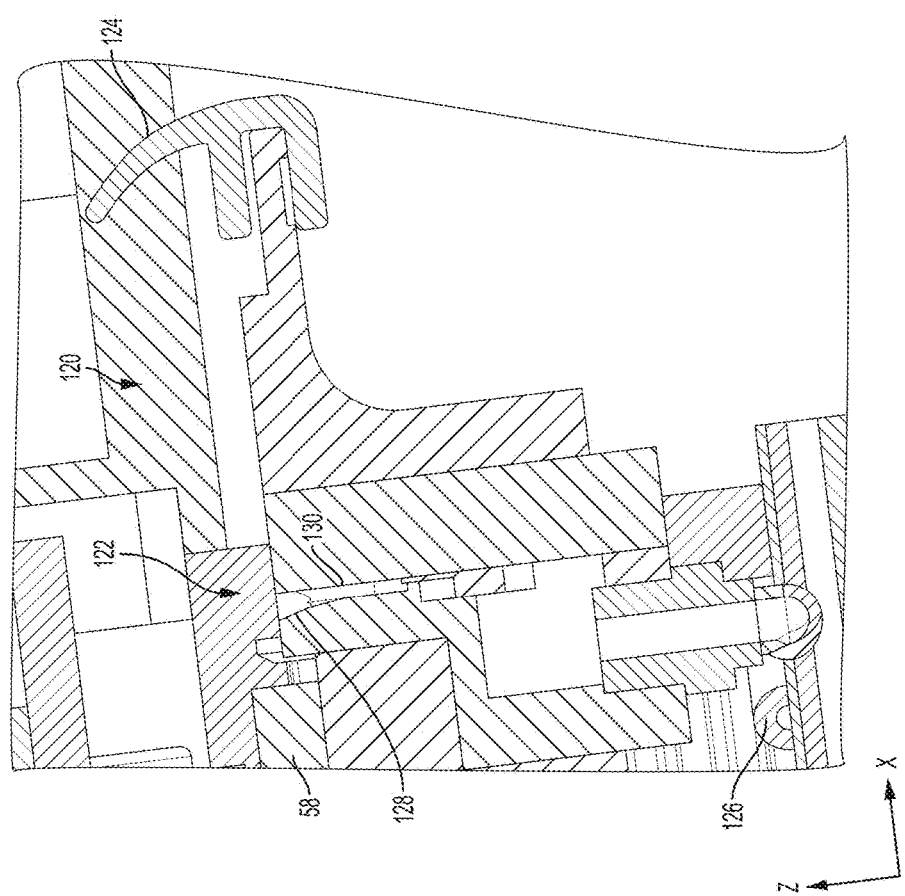
FIG. 9 is an example gas port configuration that can be used on the gas fill device of FIG. 8.

FIG. 9 is a cross-sectional illustration of gas fill device 120 showing one example configuration of a gas port 122 that can be used on the device. As shown in this example, gas port 122 is in selective fluid communication with a gas manifold 126 that supplies insulative gas to the gas port. Gas port 122 opens vertically upward (e.g., in the positive Z-direction indicated on FIG. 9) to deliver insulative gas upwardly into a space established between one glazing pane held to first platen 52 (FIG. 5) and another glazing pane held to second platen 54 (FIG. 7). Gas port 122 increases in cross-sectional area as the gas port travels vertically upward. For example, gas port 122 has a wall surface 128 that flares away from an opposed wall surface 130 as the gas port travels vertically upward. In some examples, gas port 122 has a maximum cross-sectional area at the outlet of the gas port, where the gas port discharges into processing zone 56 (FIG. 5).

Configuring the one or more gas ports 122 of gas fill device 120 to have outlets that are larger in cross-sectional area than the inlets of the gas ports may useful to discharge gas from the ports within the laminar flow regime. For example, instead of discharging insulative gas from the one or more gas ports 122 within the turbulent flow regime, insulative gas discharging from gas ports 122 can be within the laminar flow regime. This can help minimize and/or control intermixing between the discharging insulative gas and ambient air. In turn, this can permit a partially fabricated insulating glazing unit to be filled to a target insulative gas concentration (e.g., 75%, 90%, insulative gas) faster than if the discharging insulative gas mixes with air more extensively.

Independent of whether the one or more gas ports 122 discharge insulative gas within the laminar flow regime, configuring gas fill device 120 with multiple gas ports arranged along the length of processing zone 56 (FIG. 5) can be useful to control and limit the region of the processing zone to which gas is delivered. Each gas port 122 (or each of multiple series of ports) may be independently controllable, e.g., via one or more valves connected to each gas port, so as to selectively close gas communication through some but not all of the gas ports during fabrication of a particular multiple-pane insulating glazing unit. For example, gas flow through ports at one end of gas fill device 120 (e.g., one quarter, or one half of the length of the device) can be closed, limiting gas flow to gas ports open at the other end of the device. This may be useful where a particular insulating glazing unit being fabricated does not occupy the entire length of processing zone 56.

As discussed above, processing station 50 may be sized to process the largest glazing panes, and the largest multiple-pane insulating glazing units, expected to be fabricated by a manufacturing facility. In practice, however, many multiple-pane insulating glazing units actually fabricated by the facility may be smaller than the largest possible multiple-pane insulating glazing units. If gas fill device 120 were not configured to limit gas flow to smaller sections of the elongated manifold, the entire space between first platen 52 and second platen 54 may need to be filled with insulative gas during fabrication of a glazing unit, including those regions of the processing station not occupied by glazing pane material. By configuring gas fill device 120 with multiple independently openable and closable gas ports 122, or series of ports, gas flow can be limited to the specific region between first platen 52 and second platen 54 actually occupied by glazing pane material, such as the specific region bounded by first movable seal 92 on one side and second movable seal 94 on an opposite side (FIG. 7). That being said, in other configurations, gas fill device 120 may only have a single gas port or multiple gas ports that are not arranged along the entire length of the device. The gas ports 122 in these examples may be positioned at a location on gas fill device 120 expected to be positioned under most or all insulating glazing units fabricated using processing station 50.

Gas fill device 120 can be positioned at any suitable location on processing station 50. In some examples, gas fill device 120 is fixedly attached to processing station 50 such that the gas fill device does not move relative to first platen 52 and/or second platen 54 during fabrication of a multiple-pane insulating glazing unit. In other examples, including the example of FIG. 8, gas fill device 120 is configured to be movably positioned under and between first platen 52 and second platen 54 during fabrication of a glazing unit. To facilitate movement and positioning of gas fill device 120 in the example of FIG. 8, the gas fill device is attached to an outward edge of conveyor line 58. Thus, the example of FIG. 8 provides a longitudinally elongated gas fill device 120 carried alongside conveyor line 58 and extending along at least substantially the entire longitudinal length of the platens 52, 54. The gas fill device 120 may be moveable along a transverse axis such that its lateral positioning relative to the two platens is adjustable.

In use, conveyor line 58 can be moved from a retracted position under first platen 52 (e.g., as shown in FIG. 5) to an operating position in which the conveyor line is positioned between first platen 52 and second platen 54. After loading two or more glazing panes and one or more glazing spacers into processing station 50 using conveyor line 58, conveyor line 58 can be partially or fully retracted under first platen 52 (e.g., by moving the conveyor in the negative X-direction indicated on FIG. 5). This can position gas fill device 120 between first platen 52 and second platen 54 for filling the space between the two platens with insulative gas. After gas filling and pressing the insulating glazing panes inside of processing station 50 together to form a multiple-pane insulating glazing unit, conveyor line 58 can again be moved from a retracted position under first platen 52 to an operating position in which the conveyor line is positioned between first platen 52 and second platen 54. Conveyor line 58 can then be operated to discharge a fabricated multiple-pane insulating glazing unit from processing station 50 and insert new glazing components for fabrication of another multiple-pane insulating glazing unit. To facilitate repositioning between a retracted position and an operating position, conveyor line 58 can also be vertically adjustable (e.g., in the positive and negative Z-direction indicated on FIG. 8). In use, conveyor line 58 may move from a position partially or fully retracted under first platen 52 to a position between first platen 52 and second platen 54. Once so positioned, conveyor line 58 may move vertically upwards (e.g., in the positive Z-direction indicated on FIG. 8) relative to second platen 54 to position the conveyor line and/or gas fill device 120 in an appropriate working position.

To help seal the bottom side of processing station 50 between first platen 52 and second platen 54 for gas filling, processing station 50 may include a bottom seal. In the example of FIG. 8, processing station 50 includes a bottom seal 124 extending outwardly from gas fill device 120. During fabrication of a multiple pane insulating glazing unit, bottom seal 124 may be pressed against a bottom edge of second platen 54, sealing the bottom edge of processing zone 56 (FIG. 4) with gas fill device 120 and bottom seal 124. When so configured, a sealed gas fill chamber may be established inside of processing station 50 bounded collectively by first platen 52, second platen 54, first movable seal 92, second movable seal 94, and gas fill device 120. In some examples, the top of the processing station 50 between first platen 52 and second platen 54 remains open to atmospheric air so that multiple-pane insulating glazing units fabricated using the processing station are filled with insulative gas to approximately atmospheric pressure. In other examples, processing station 50 may include a top seal that seals the top space between first platen 52 and second platen 54.

The equipment and techniques described in this disclosure can be used to fabricate a variety of different sized and shaped multiple-pane insulating glazing units. The equipment and techniques can be used to fabricate a double pane insulating glazing unit by loading two glazing panes and one glazing spacer into a processing station. Inside of the processing station, a space between the two glazing panes can be gas filled and the panes pressed together with the glazing spacer positioned between the two panes. The equipment and techniques can also be used to fabricate insulating glazing units have three or more panes. In these examples, a multiple-pane insulating glazing unit that has three or more glazing panes sealed together with two or more spacers to define two or more sealed between-pane spaces can be produced in the processing station. Inside of the processing station, a space between each two panes can be gas filled. In one method, three panes are conveyed in series into the processing station 50. Two spacers are adhered respectively to two of the panes, while one of the panes does not have a spacer adhered to it. The leading conveyed pane (or first pane) is moved to a desired position between the two platens 52, 54. The second platen 54 is then moved toward the first platen 52 until suction ports 80 on the second platen 54 reach the first pane and suction attach it to the second platen 54. The second platen 54 carrying the first pane is then moved away from first platen 52. The second pane is then conveyed to the desired position between the two platens. The second platen 54 carrying the first pane then moves toward the first platen 52 until the spacer between the first and second panes is squeezed between, and sealed to, those panes. The second platen 54, while holding the resulting double pane unit, then moves away from the first platen, creating clearance for the third pane to be conveyed to the desired position between the two platens. The second platen 54 carrying the double pane unit then moves toward the first platen 52 until the spacer between the second and third panes is squeezed between, and sealed to, those panes. The resulting triple pane unit is then ready to be discharged from the processing station.

FIG. 10 is an example multiple-pane insulating glazing unit 150 that can be fabricated using the equipment and techniques discussed herein. Insulating glazing unit 150 in the example of FIG. 10 has two glazing panes 152, 154 separated by one glazing spacer 156. When assembled, glazing spacer 156 is adhered about the perimeter of both glazing pane 152 and glazing pane 154, defining a between-pane space having a width equal to the thickness of the glazing spacer (including any sealant on the sides of the spacer). The between-pane space bounded by the two glazing panes 152, 154 and the glazing spacer 156 can be filled with an insulative gas, such as a mixture of 90% argon and 10% air.

Glazing panes 152, 154 can be fabricated from any suitable material. In some examples, at least one (and optionally all) of the glazing panes are formed of glass. In various examples, the glass may be aluminum borosilicate glass, sodium-lime (e.g., sodium-lime-silicate) glass, or another type of glass. In addition, the glass may be clear or the glass may be colored, depending on the application. In other examples, at least one (and optionally all) of the glazing panes are formed of plastic such as, e.g., a fluorocarbon plastic, polypropylene, polyethylene, or polyester. In still other examples, the glazing panes are formed from multiple different types of materials. For example, the panes may be formed of a laminated glass, which may include two panes of glass bonded together with polyvinyl butyral.

Independent of the specific materials used to form glazing panes 152, 154, the panes can have a variety of different sizes and shapes. In some applications, such as some window and door applications, glazing panes 152, 154 may each define a planar substrate that is rectangular or square in shape. For example, glazing panes 152, 154 may each define a planar substrate that is rectangular or square in shape and has a major dimension (e.g., width or length) greater than 0.5 meters (m) such as, e.g., greater than 1 m, greater than 2 m, or between 0.5 m and 2 m. Other sizes and shapes, including, but not limited to, circles, ovals, triangles, pentagons, hexagons, and octagons can be used.

Depending on the application, glazing pane 152 and/or glazing pane 154 may be coated with one or more functional coatings to modify the performance of the panes. Example functional coatings include, but are not limited to, low-emissivity coatings, solar control coatings, and photocatalytic coatings. In general, a low-emissivity coating is a coating that is designed to allow near infrared and visible light to pass through a pane while substantially preventing medium infrared and far infrared radiation from passing through the panes. A low-emissivity coating may include one or more layers of infrared-reflection film interposed between two or more layers of transparent dielectric film. The infrared-reflection film may include (or, in other examples, consist or consist essentially of) a conductive metal like silver, gold, or copper. Advantageous low-emissivity coatings include the LoE-180™, LoE-272™, and LoE-366™ coatings available commercially from Cardinal CG Company of Spring Green, Wis., U.S.A. A photocatalytic coating, by contrast, may be a coating that includes a photocatalyst, such as titanium dioxide. In use, the photocatalyst may exhibit photoactivity that can help self-clean, or provide less maintenance for, the panes. Advantageous photocatalytic coatings include the NEAT® coatings available from Cardinal CG Company.

Insulating glazing unit 150 can be filled with an insulative gas using the equipment and techniques described herein. Example insulative gases include argon, krypton, dry air, and mixtures thereof. In one example, the between-pane spaces are filled with a mixture that includes greater than 50 volume percent argon and a balance volume percentage dry air such as, e.g., greater than 75 volume percent argon and a balance percentage dry air. Filling the between-pane space of a multiple-pane insulating glazing unit with an insulative gas may reduce thermal transfer across the unit as compared to when the between-pane space is filled with atmospheric air.

Glazing spacer 156 may be any structure that holds opposed glazing panes in a spaced apart relationship over the service life of insulating glazing glass unit 150 and seals a between-pane space between the opposed panes of material, e.g., so as to inhibit or eliminate gas exchange between the between-pane space and an environment surrounding insulating glazing unit 150. One example of a spacer that can be used as glazing spacer 156 is a tubular spacer positioned between glazing panes 152, 154. The tubular spacer may define a hollow lumen or tube which, in some examples, is filled with desiccant. The tubular spacer may have a first side surface adhered (by a first bead of sealant) to glazing pane 152 and a second side surface adhered (by a second bead of sealant) to glazing pane 154. A top surface of the tubular spacer can exposed to the between-pane space of the glazing unit and, in some examples, includes openings that allow gas within the between-pane space to communicate with desiccating material inside of the spacer. Such a spacer can be fabricated from aluminum, stainless steel, a thermoplastic, or any other suitable material. Advantageous glazing spacers are available commercially from Allmetal, Inc. of Itasca, Ill., U.S.A.

Another example of a spacer that can be used as spacer 156 is a spacer formed from a corrugated metal reinforcing sheet surrounded by a sealant composition. The corrugated metal reinforcing sheet may be a rigid structural component that holds glazing pane 152 apart from glazing pane 154. Such a spacer is often referred to in commercial settings as swiggle spacer. In yet another example, spacer 156 may be formed from a foam material surrounded on all sides except a side facing a between-pane space with a metal foil. Such a spacer is commercially available from Edgetech under the trade name Super Spacer®. As another example, spacer 156 may be a thermoplastic spacer (TPS) spacer formed by positioning a primary sealant between glazing panes 152, 154 followed, optionally, by a secondary sealant applied around the perimeter defined between glazing panes 152, 154 and the primary sealant. Spacer 156 can have other configurations, as will be appreciated by those of ordinary skill in the art.

Different insulating glazing unit fabrication systems, devices, and techniques have been described in relation to FIGS. 1-10. FIG. 11 is a flow chart illustrating an example method for constructing an insulating glazing unit. For ease of description, the method of FIG. 11 is generally described with respect to system 10 (FIGS. 1-3) where processing stations 16 are configured as described with respect to processing station 50 (FIGS. 4-9). In other examples, however, the method of FIG. 11 may be performed using other equipment configurations, as described herein.

As shown in FIG. 11, a multiple-pane insulating glazing unit can be fabricated by aligning one of a plurality of laterally spaced-apart processing stations 16 with a longitudinally extending conveyor 12 (250). In some examples, processing stations 16 move transversely relative to conveyor 12 until a desired one of the processing stations is aligned with conveyor 12. For example, each processing station 16 and an associated staging station 22 may move cross-wise relative to ingress conveyor section 12A until a desired one of the processing stations and its associated station (e.g., processing station 16A and staging station 22A) is aligned with ingress conveyor section 12A. In other examples, conveyor 12 moves relative to stationary processing stations to align a desired one of the processing stations with the conveyor. For example, ingress conveyor section 12A can be equipped with a transport system that moves the conveyor section relative to processing stations 16 and staging stations 22 (when used), which can remain stationary while the ingress conveyor section is moving. In different applications in accordance with this example, ingress conveyor section 12A may move transversely to processing stations 16 about a translation axis or may move radially about a pivot axis. In any application, one of the plurality of laterally spaced-apart processing stations 16 (and its corresponding staging station 22, when used) can be aligned with conveyor 12 such that two or more glazing panes and one or more glazing spaces can be conveyed along conveyor 12 into the aligned processing station.

With a desired one of laterally spaced-apart processing stations 16 aligned with conveyor 12, two or more glazing panes and one or more glazing spacers are conveyed into the aligned processing station (252). For example, the aligned processing station can be opened by moving second platen 54 away from first platen 52 to create an opening between the two platens sufficient large to receive one or more glazing panes and one or more glazing spacers. Further, conveyor line 58 can be moved from a retracted position under first platen 52 to a working position between first platen 52 and second platen 54. In the working position, conveyor line 58 may be co-linear with conveyor line 26 of staging station 22 (when used) and both ingress conveyor section 12A and egress conveyor section 12B.

To convey two or more glazing panes and one or more glazing spacers into the aligned processing station, conveyor line 58 of the aligned processing station can be operated to transport a first glazing pane to a desired position between the two platens 52, 54. In some examples, conveyor line 58 of the aligned processing station is operated simultaneously with conveyor line 26 of a corresponding aligned staging station 22 and/or ingress conveyor section 12A. In other examples, the different conveyor lines in system 10 operate at different times. For example, ingress conveyor section 12A may operate to initially convey two or more glazing panes and one or more glazing spacers onto a staging station 22 paired with the aligned processing station 16. Subsequently, conveyor line 26 of the aligned staging station 22 and conveyor line 58 of the aligned processing station 16 can operate to load the two or more glazing panes and one or more glazing spacers previously received from ingress conveyor section 12A. In this regard, the actual loading of the aligned processing station 16 with the two or more glazing panes and one or more glazing spacers may occur after the aligned processing station moves out of alignment with conveyor 12 and a different one of the plurality of laterally spaced-apart processing stations moves into alignment with the conveyor line.

Regardless of the specific position of the aligned processing station 16 relative to ingress conveyor section 12A at the time of loading, conveyor line 58 of the aligned processing station can be operated to convey a first glazing pane to a desired position between the two platens 52, 54. To transport the first glazing pane, conveyor line 58 can be positioned in a gap separating first platen 52 from second platen 54 such that the aligned processing station is bounded by conveyor line 58 and first and second platens 52, 54. First movable seal 92 and second movable seal 94 can be positioned at the side of first platen 52 and/or second platen 54 at this point in time such that the seals are not in the space separating first platen 52 from second platen 54, thereby allowing the glazing pane to travel along conveyor line 58 without contacting the seals.

With the first glazing pane moved to a desired position between first platen 52 and second platen 54, conveyor line 58 can cease movement. Further, second platen 54 can move toward first platen 52 until suction ports 80 on the second platen 54 reach the glazing pane and suction attach it to the second platen 54. The second platen 54 carrying the first pane can then be moved away from first platen 52, enlarging the distance separating the first platen from the second platen. Conveyor line 58 can then be further operated to convey a second glazing pane to the desired working position between the first platen 52 and second platen 54. Once positioned, suction ports 80 on first platen 52 can suction attach the second glazing pane to the first platen 52.

To enable fabrication of the multiple-pane insulating glazing unit, either the first or second glazing pane can have a spacer adhered about its perimeter. The spacer may have a bead of compressible sealant on one side of the spacer that is pressed against the glazing pane carrying the spacer. The spacer may another bead of compressible sealant on the opposite side of the spacer. Accordingly, once the processing station is loaded with glazing panes and a glazing spacer, the processing station may have a glazing pane suction attached to first platen 52 and another glazing pane suction attached to second platen 54. One of the glazing panes can have a spacer sealed about its perimeter. An opposite surface of the spacer can carry a sealant bead and can face the opposed glazing pane and be spaced therefrom.

The example technique of FIG. 11 also includes assembling the two or more glazing panes and the one or more glazing spacers into a multiple-pane insulating glazing unit inside of the loaded processing station (254). To seal the side edges of the processing station loaded with the glazing panes and glazing spacer, first movable seal 92 and second movable seal 94 can move to a sealing position between first movable platen 52 and second movable platen 54. In some examples, first movable seal 92 and second movable seal 94 can each swing around from their initial holding positions adjacent to second platen 54 to a sealing position between first platen 52 and second platen 54. First movable seal 92 and second movable seal 94 can move longitudinally relative to first platen 52 and second platen 54 until the seals are positioned at desired working positions on opposite sides of the processing station. Once first movable seal 92 and second movable seal 94 are moved to desired working positions, second platen 54 can advance toward first platen 52, optionally contacting and compressing the movable seals 92, 94 between the two platens 52, 54.

To fill a gas chamber bounded by movable seals 92, 94 and platens 52, 54 with insulative gas, gas fill device 120 can be positioned underneath and between first platen 52 and second platen 54. For example, gas fill device 120 can be positioned underneath and between first platen 52 and second platen 54 such that one or more gas ports 122 of the device open vertically upward and direct insulative gas upwardly into a space established between the glazing pane held to first platen 52 and the glazing pane held to second platen 54. Where gas fill device 120 is configured as a longitudinally elongated manifold, the operational length of the longitudinally elongated manifold through which insulative gas is delivered can be adjusted so that insulative gas is only delivered through that portion of the longitudinally elongated manifold positioned between first movable seal 92 and second movable seal 94. In some examples, gas ports 122 are positioned outside of the region bounded by first movable seal 92 and second movable seal 94 are closed so gas does not flow through those ports during insulative gas filling.

The processing station loaded with the insulating glazing panes and insulating glazing spacer can be filled with insulating gas by opening gas communication between a gas source and gas fill device 120. This can deliver insulative gas to a gas chamber region of the processing station bounded first and second platens 52, 54, gas fill device 120, and movable seals 92, 94. After suitably filling the space between the two glazing panes inside the gas chamber with insulative gas, second platen 54 can move toward first platen 52 to press a sealant-coated face of a spacer carried by one glazing pane against an opposed glazing pane. As this is occurring, a movable section 82 of first platen 52 and/or second platen 54 can pull a section of one of the glazing panes away from a remainder of the partially fabricated insulating glazing unit inside of the processing station. This can cause the glazing pane attached to the movable section 82 to bend or flex, creating a local separation between the spacer and opposed glazing pane in the region of movable section 82 through which the partially fabricated insulating glazing unit can vent gas as the glazing panes are pressed together. After pressing the glazing panes together while holding a section of one of the glazing panes away from the remainder of the glazing unit, movable section 82 can release and/or push the section of the glazing pane attached to the movable section back toward the remainder of the insulated glazing unit, thereby completing the seal between the spacer and both of the panes carried against it.

While the loaded processing station is assembling the two or more glazing panes and the one or more glazing spacers into a multiple-pane insulating glazing unit in the example technique of FIG. 11 (254), the processing station may be positioned out of alignment with conveyor 12. For example, after conveying two or more glazing panes and one or more glazing spacers onto an aligned staging station 22 and/or into an aligned processing station 16 via ingress conveyor section 12A, the plurality of laterally spaced-apart processing stations may be moved so that a different one of the plurality of laterally-spaced apart processing stations and/or staging stations 22 are aligned with ingress conveyor section 12A. Accordingly, processing steps performed by a specific processing station such as the loading of glazing panes and glazing spacer between first platen 52 and second platen 54, the movement of first and second movable seals 92, 94 to desired working positions, the gas filling of the gas chamber defined between the platens, and/or the pressing of glazing panes and glazing spacer together can occur while the processing station is out of alignment with ingress conveyor section 12A and/or simultaneously while the processing station is moving relative to ingress conveyor section 12A.

To complete fabrication of a multiple-pane insulating glazing unit, the loaded processing station can again be moved into alignment with conveyor 12. For example, each processing station 16 may move cross-wise relative to egress conveyor section 12B until the loaded processing stations is aligned with egress conveyor section. In other examples, as discussed above, conveyor 12 may move relative to stationary processing stations to align the loaded processing station with the conveyor. In either case, the loaded processing station can be aligned with conveyor 12.

At this point in the operation of system 10, a fabricated multiple-pane insulating glazing unit can be discharged from the processing station or an additional glazing pane and glazing spacer loaded into the processing station, e.g., to fabricate a multiple-pane insulating glazing unit having yet an additional glazing pane. For example, if the multiple-pane insulating glazing unit is desired to be discharged from the aligned processing station, first platen 52 and second platen 54 can move apart and first and second movable seals 92, 94 can move to side positions offset from the space between the two platens. Conveyor line 58 of the aligned processing station and/or egress conveyor section 12B can then operate to convey the fabricated multiple-pane insulating glazing unit out of the processing unit. Alternatively, if it is desired to add an additional glazing pane and glazing spacer to the multiple-pane insulating glazing unit already within the aligned processing unit, an additional glazing pane carrying an additional glazing spacer can be loaded into the aligned processing station via ingress conveyor section 12A. For example, second platen 54, while holding the multiple-pane insulating glazing unit already fabricated in the processing station, can move away from first platen 52, creating an opening for an additional glazing pane carrying an additional glazing spacer to be conveyed to the desired position between the two platens. The aligned processing station can then gas fill the space between the additional glazing pane and already fabricated multiple-pane insulating glazing unit and press the components together, as discussed above.

Various examples have been described. These and other examples are within the scope of the following claims.

The invention claimed is:

1. A system for producing multiple-pane insulating glazing units, the system comprising: a conveyor and a machine that assembles two or more glazing panes and one or more glazing spacers into a multiple-pane insulating glazing unit, the conveyor comprising a longitudinally extending conveyor line configured to transport the two or more glazing panes to the machine, the machine comprising a plurality of laterally spaced-apart processing stations, each processing station being movable transversely, along a transverse axis, relative to the longitudinally extending conveyor line to provide one of the plurality of laterally spaced-apart processing stations that is aligned with the longitudinally extending conveyor line while at least one other of the plurality of laterally spaced-apart processing stations is out of alignment with the longitudinally extending conveyor line, said at least one other of the plurality of laterally spaced-apart processing stations when out of alignment with the longitudinally extending conveyor line being operable to process the two or more glazing panes and one or more glazing spacers therein to fabricate the multiple-pane insulating glazing unit, wherein each of the plurality of laterally spaced apart processing stations comprises a processing zone located between two platens, wherein each processing zone is configured to receive the two or more glazing panes and one or more glazing spacers.

2. The system of claim 1, wherein the transverse axis is substantially perpendicular to a longitudinal axis along which the longitudinally extending conveyor line extends.

3. The system of claim 1, wherein each processing station is configured to independently: i) assemble the two or more glazing panes and the one or more glazing spacers into the multiple-pane insulating glazing unit, and ii) deliver insulative gas into at least one between-pane space of the multiple-pane insulating glazing unit.

4. The system of claim 1, wherein at least one of the two platens of each processing station is movable toward or away from the other platen of such processing station.

5. The system of claim 1, wherein each processing station has its own conveyance line, the conveyance line of each processing station being disposed adjacent a lower region of one of the two platens of the station.

6. The system of claim 1, wherein each processing station has its own gas fill device, each gas fill device having at least one outlet configured to deliver insulative gas into a partially fabricated insulating glazing unit.

7. The system of claim 6, wherein each gas fill device comprises a longitudinally elongated manifold having the at least one outlet, the at least one outlet being either a single longitudinally elongated opening or a series of longitudinally spaced-apart openings.

8. The system of claim 1, wherein each processing station comprises a pair of movable seals, each seal being movable longitudinally relative to and between the two platens of each the processing station, such that the two seals of each processing station, when moved to desired working positions, delineate side boundaries of a gas fill chamber in which a partially fabricated insulating glazing unit can be disposed.

9. The system of claim 8, wherein the machine is configured such that, when the two seals of a given one of the plurality of laterally spaced-apart processing stations are moved to the desired working positions, at least one of the two platens of the given one of the plurality of laterally spaced-apart processing stations is movable toward the other platen of the processing station, such that the gas fill chamber of the processing station is bounded collectively by the two platens, the two seals, and a longitudinally elongated manifold having at least one outlet configured to deliver insulative gas into the gas fill chamber of the processing station.

10. The system of claim 1, wherein the longitudinally extending conveyor line has a single-line ingress section and a single-line egress section, the single-line ingress section being configured to transport the two or more glazing panes to the machine, the single-line egress section being configured to convey multiple-pane insulating glazing units from the machine.

11. The system of claim 1, wherein the machine further comprises a plurality of laterally spaced-apart staging stations, each staging station being movable transversely relative to the longitudinally extending conveyor line, each staging station comprising its own platen and conveyance line, the staging stations being upstream of the processing stations.

12. The system of claim 11, wherein each staging station is associated with one of the plurality of laterally spaced-apart processing stations, such that a given staging station is configured to deliver a plurality of glazing panes selectively to one of the plurality of laterally spaced-apart processing stations associated with that given staging station, the processing stations and staging stations being configured to move together and transversely relative to the longitudinally extending conveyor line.

13. The system of claim 11, wherein each processing station has two platens, while each staging station has one platen, the platen of each staging station being generally co-planar to one of the two platens of a respective processing station.

14. The system of claim 1, wherein the plurality of laterally spaced-apart processing stations consists of three processing stations.

15. The system of claim 1, wherein the longitudinally extending conveyor line comprises a flipper device configured to rotate about a vertical axis so as to reverse a facing orientation of one or more panes to be delivered to the machine, and wherein the machine is configured to assemble at least two different types of multiple-pane insulating glazing units including double pane insulating glazing units and triple pane insulating glazing units.

16. The system of claim 1, wherein said one of the plurality of laterally spaced-apart processing stations that is aligned with the longitudinally extending conveyor line is on a longitudinal axis of the longitudinally extending conveyor line so as to configure the machine for loading the two or more glazing panes and one or more glazing spacers from the longitudinally extending conveyor line into said one of the plurality of laterally spaced-apart processing stations that is aligned with the longitudinally extending conveyor line.

17. The system of claim 1, wherein the longitudinally extending conveyor line includes an ingress conveyor section, and wherein each of the plurality of laterally spaced-apart processing stations includes a conveyance line adjacent its lower region, such that the conveyance line of said one of the plurality of laterally spaced-apart processing stations that is aligned with the longitudinally extending conveyor line is co-linear with the ingress conveyor section of the longitudinally extending conveyor line.

18. The system of claim 1, further comprising a transport system that comprises a plurality of rails along which said plurality of laterally spaced-apart processing stations are movable transversely relative to the longitudinally extending conveyor line.

19. The system of claim 18, wherein said plurality of rails includes two or more rails that extend parallel to each other and cross-wise to a longitudinal axis of the longitudinally extending conveyor line.

20. The system of claim 18, wherein said plurality of rails are arranged transverse to the longitudinally extending conveyor line to provide pathways along which said plurality of laterally spaced-apart processions stations are moveable relative to the longitudinally extending conveyor line, such that all of said plurality of laterally spaced-apart processing stations are configured to move along a path of machine travel extending perpendicular to a longitudinal axis of the longitudinally extending conveyor line.

21. The system of claim 1, wherein each of said plurality of laterally spaced-apart processions stations has a continuous track and/or wheels that roll along a surface on which said plurality of laterally spaced-apart processions stations reside.

22. The system of claim 1, wherein each of said plurality of laterally spaced-apart processing stations is configured to assemble at least two types of multiple-pane insulating glazing units, said two types including a double-pane insulating glazing unit and a triple-pane insulating glazing unit.

23. The system of claim 1, wherein said machine has a cycle time, measured over an 8 hour period, of less than one minute per unit.

24. The system of claim 23, wherein said cycle time is less than 30 seconds per unit.

25. The system of claim 23, wherein said cycle time is for producing triple-pane insulating glazing units.

* * * * *